United States Patent
Jakobi et al.

(10) Patent No.: US 11,220,635 B2
(45) Date of Patent: Jan. 11, 2022

(54) PIPE AND DEVICE FOR THERMALLY CLEAVING HYDROCARBONS

(71) Applicant: SCHMIDT + CLEMENS GMBH + CO. KG, Lindlar (DE)

(72) Inventors: Dietlinde Jakobi, Cologne (DE); Steffen Alexander Heyland, Overath (DE); Jorg Dietmar Weigandt, Kaarst (DE)

(73) Assignee: SCHMIDT + CLEMENS GMBH + CO. KG, Lindlar (DE)

( * ) Notice: Subject to any disclaimer, the term of this patent is extended or adjusted under 35 U.S.C. 154(b) by 150 days.

(21) Appl. No.: 16/500,595

(22) PCT Filed: Apr. 4, 2018

(86) PCT No.: PCT/EP2018/058615
§ 371 (c)(1),
(2) Date: Oct. 3, 2019

(87) PCT Pub. No.: WO2018/185167
PCT Pub. Date: Oct. 11, 2018

(65) Prior Publication Data
US 2020/0190408 A1    Jun. 18, 2020

(30) Foreign Application Priority Data

Apr. 7, 2017   (DE) .......................... 102017003409.5
Apr. 7, 2017   (EP) ..................................... 17000601

(51) Int. Cl.
*C10G 9/16* (2006.01)
*C10G 9/36* (2006.01)
(Continued)

(52) U.S. Cl.
CPC ................ *C10G 9/16* (2013.01); *B01J 8/062* (2013.01); *B01J 19/2415* (2013.01); *C10G 9/20* (2013.01);
(Continued)

(58) Field of Classification Search
CPC ... C10G 9/36; C10G 9/20; C10G 9/40; C10G 9/16; C10G 45/26; F28F 1/40; F28F 1/00;
(Continued)

(56) References Cited

U.S. PATENT DOCUMENTS 4,776,177 A   10/1988  Jancic et al.
5,016,460 A    5/1991  England et al.
(Continued)

FOREIGN PATENT DOCUMENTS

CA         2493463 A1    2/2004
CN     201770662 U  *    3/2011
(Continued)

OTHER PUBLICATIONS

English translation of International Search issued on International Patent Application No. PCT/EP2018/058615 dated May 28, 2018.

*Primary Examiner* — Devon Russell
(74) *Attorney, Agent, or Firm* — Howard IP Law Group, PC; Edward J. Howard

(57) ABSTRACT

The invention relates to a pipe for thermal cracking of hydrocarbons in the presence of steam, in which the feed mixture is guided through externally heated pipes, wherein the pipe extends along a longitudinal axis and has a number $N_T$ of grooves that have been introduced into the inner surface of the pipe and extend in a helix around the longitudinal axis along the inner surface,
the inner surface into which the grooves have been introduced, in a cross section at right angles to the longitudinal axis, has a diameter Di and a radius $r_1 = Di/2$, (Continued)

Figure 1:
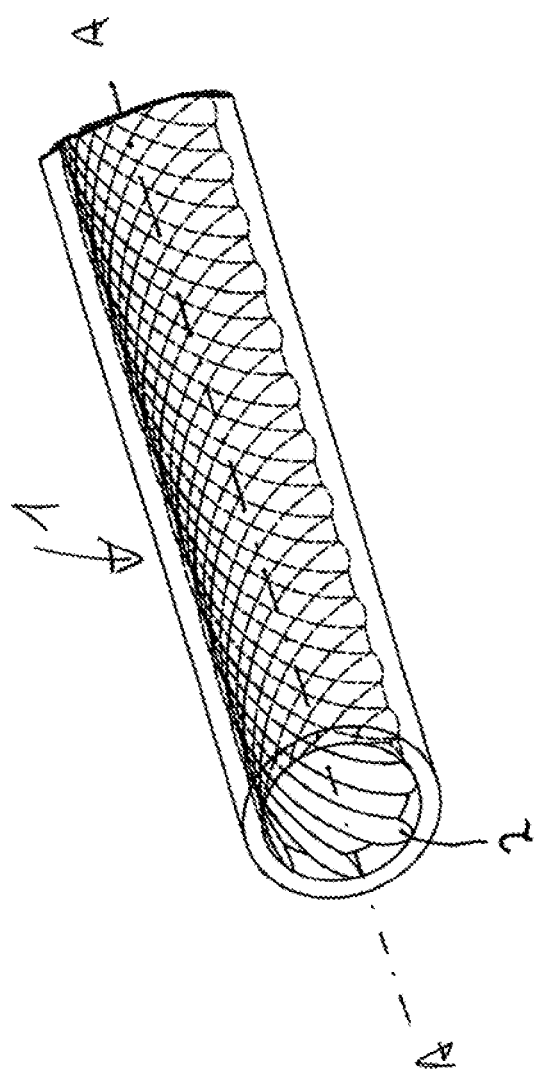

the grooves in the cross section at right angles to the longitudinal axis, in their groove base, each have the form of a circular arc and the circular arc has a radius $r_2$, and the grooves each have a groove depth TT which, in the cross section at right angles to the longitudinal axis, corresponds in each case to the smallest distance between the circle having the diameter Di on which the inner surface lies and the center of which lies on the longitudinal axis, and the furthest removed point of the groove base of the grooves from the longitudinal axis.

12 Claims, 4 Drawing Sheets

(51) Int. Cl.
| | |
|---|---|
| *B01J 19/24* | (2006.01) |
| *B01J 8/06* | (2006.01) |
| *C10G 9/20* | (2006.01) |
| *C10G 45/26* | (2006.01) |
| *F28F 1/40* | (2006.01) |
| *F28F 13/00* | (2006.01) |
| *F28F 1/00* | (2006.01) |
| *F28F 13/18* | (2006.01) |
| *F28F 13/02* | (2006.01) |
| *F28F 1/10* | (2006.01) |

(52) U.S. Cl.
CPC ............... *C10G 9/36* (2013.01); *C10G 45/26* (2013.01); *C10G 2300/807* (2013.01); *F28F 1/00* (2013.01); *F28F 1/10* (2013.01); *F28F 1/40* (2013.01); *F28F 13/00* (2013.01); *F28F 13/02* (2013.01); *F28F 13/18* (2013.01)

(58) Field of Classification Search
CPC .... F28F 1/10; F28F 13/00; F28F 13/02; F28F 21/083; F28D 2021/0075; B01J 8/062; B01J 19/2415
See application file for complete search history.

(56) References Cited

U.S. PATENT DOCUMENTS

| | | | |
|---|---|---|---|
| 5,409,675 A | 4/1995 | Narayanan | |
| 5,950,718 A * | 9/1999 | Sugitani | B01J 19/2415 165/133 |
| 6,644,358 B2 | 11/2003 | Demarest et al. | |
| 10,053,756 B2 | 8/2018 | Jakobi et al. | |
| 2003/0019533 A1* | 1/2003 | Demarest | F28F 1/40 138/177 |
| 2004/0147794 A1 | 7/2004 | Brown et al. | |
| 2005/0131263 A1* | 6/2005 | Wolpert | C10G 9/20 585/652 |
| 2008/0014342 A1 | 1/2008 | Jakobi et al. | |
| 2014/0060586 A1 | 3/2014 | Hill | |
| 2014/0257001 A1* | 9/2014 | Spicer | C07C 4/04 585/300 |
| 2018/0195008 A1* | 7/2018 | Rampure | F28F 19/00 |

FOREIGN PATENT DOCUMENTS

| | | |
|---|---|---|
| DE | 19523280 A1 | 1/1997 |
| DE | 10233961 A1 | 2/2004 |
| DE | 202004016252 U1 | 12/2005 |
| EP | 0218545 A2 | 4/1987 |
| EP | 0980729 A1 | 2/2000 |
| EP | 1136541 A1 | 9/2001 |
| EP | 1515075 A2 | 3/2005 |
| EP | 1525289 B9 | 4/2005 |
| FR | 2410238 A1 | 6/1979 |
| GB | 969796 A | 9/1964 |
| JP | 11199876 A | 7/1999 |
| JP | 2004536268 A | 12/2004 |
| JP | 2005533917 A | 11/2005 |
| WO | 9856872 A1 | 12/1998 |
| WO | 0242510 A1 | 5/2002 |
| WO | 2008033193 A1 | 3/2008 |
| WO | 2010043375 A1 | 4/2010 |

* cited by examiner

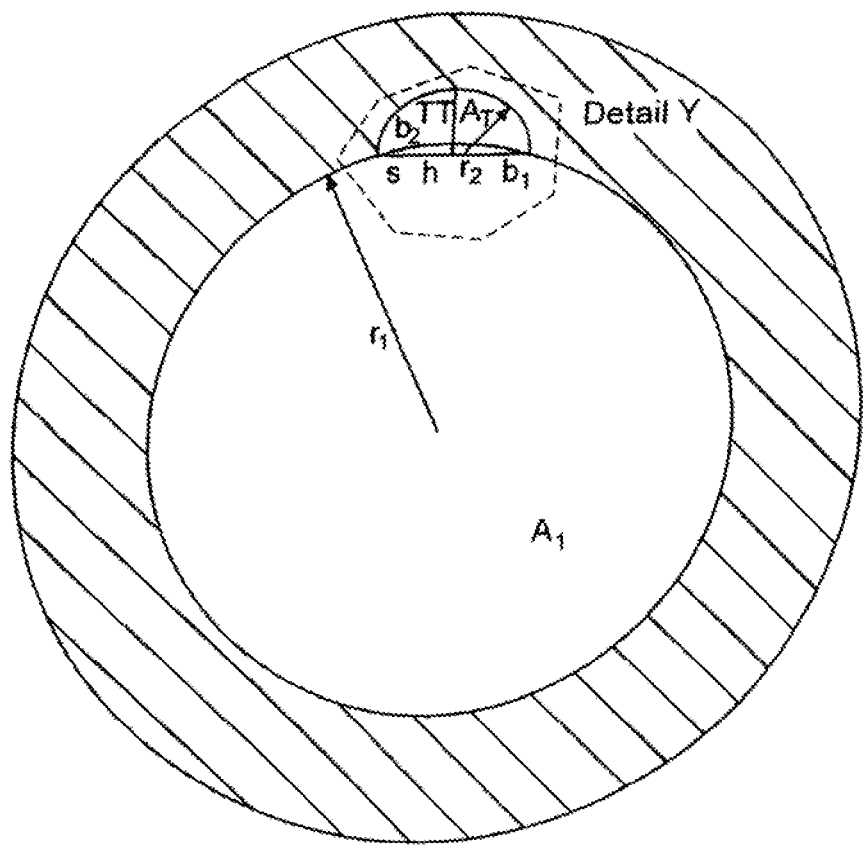
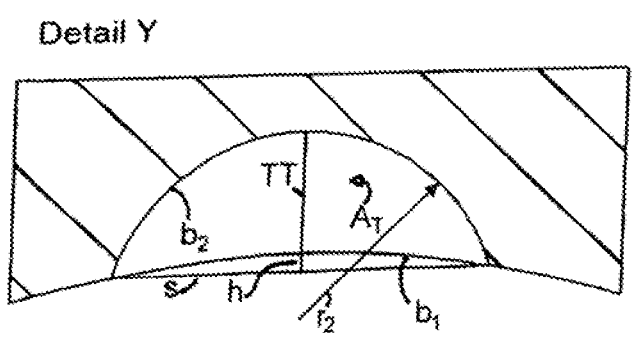
Fig. 5

PIPE AND DEVICE FOR THERMALLY CLEAVING HYDROCARBONS

CROSS-REFERENCE TO RELATED APPLICATIONS

This application is the national stage application under 35 U.S.C. § 371 of International Application No. PCT/EP2018/058615 filed on Apr. 4 2018, and claims the benefit of DE 102017003409.5 filed on Apr. 7, 2017 and EP 17000601.9 filed on Apr. 7, 2017, the entire disclosures of which are incorporated herein by reference in their entireties.

The invention relates to a pipe for thermal cracking of hydrocarbons in the presence of steam, in which the feed mixture is guided through externally heated pipes. The invention further relates to an apparatus for thermal cracking of hydrocarbons.

For the high-temperature pyrolysis of hydrocarbons (mineral oil derivatives), pipe furnaces have been found to be useful, in which a hydrocarbon/steam mixture at temperatures exceeding 750° C. is guided through rows of individual pipes or pipes in a meandering arrangement (cracking pipe coils) made of heat-resistant nickel-chromium-iron alloy with high oxidation resistance/scaling resistance and high carburization resistance. The pipe coils consist of straight pipe sections that run vertically or horizontally and are joined to one another via U-shaped pipe curves or are arranged parallel to one another. They are typically heated with the aid of sidewall burners and/or else with the aid of base burners and therefore have a "light side" facing the burners and a "dark side" offset by 90°, i.e. running in the direction of the rows of pipes. The average pipe wall temperatures (TMT) here in some cases exceed 1000° C.

The lifetime of the cracking pipes depends very significantly on the creep resistance and carburization resistance and on the carbonization rate of the pipe material. Crucial factors for the carbonization rate, i.e. for the growth of a layer of carbon deposits (pyrolysis coke) on the inner pipe wall, are not only the type of hydrocarbons used but also the cracking gas temperature in the inner wall region and what is called the cracking severity, which comprehends the effect of the system pressure and the dwell time in the pipe system on the ethylene yield. The cracking severity is adjusted using the average exit temperature of the cracking gases (e.g. 850° C.). The higher the gas temperature in the vicinity of the inner pipe wall is above this temperature, the more significant will be the growth of the layer of pyrolysis coke, the insulating effect of which causes the pipe wall temperature to rise further. Although the nickel-chromium-iron alloy with 0.4% carbon, more than 25% chromium and more than 20% nickel, for example 35% chromium, 45% nickel and optionally 1% niobium, which is used as pipe material has high carburization resistance, the carbon at defects in the oxide layer diffuses into the pipe wall, where it leads to considerable carburization that can extend as far as carbon contents of 1% to 3% at wall depths of 0.5 mm to 3 mm. This is associated with considerable embrittlement of the pipe material with the risk of cracking under thermal cycling stress, especially in the startup and shutdown of the furnace.

In order to degrade the carbon deposits (coking) at the inner pipe wall, it is necessary to stop cracking operation from time to time and burn the pyrolysis coke with the aid of a steam/air mixture. This entails an interruption of operation for up to 36 hours and therefore considerably impairs the economic viability of the process.

British patent specification 969 796 and European patent specification 1 136 541 A1 also disclose the use of cracking pipes with internal fins. Although such internal fins result in a greater inner surface area by many percent, for example 10% greater, and accordingly better heat transfer, they are also associated with the disadvantage of a considerable increase in pressure drop compared to a smooth pipe owing to friction on the increased internal pipe surface area. The higher pressure drop entails a higher system pressure, and hence inevitably alters the dwell time and worsens the yield. An additional factor is that the known pipe materials having high carbon and chromium contents can no longer be profiled by cold forming, for example cold drawing. They have the disadvantage that their formability decreases significantly with increasing heat resistance. The effect of this has been that the high pipe wall temperatures of up to 1050° C., for example, that are desired with regard to the ethylene yield require the use of centrifugally cast pipes. However, since centrifugally cast pipes can be manufactured only with a cylindrical wall, special shaping methods are required, for example an electrolytically material-removing processing operation or a shape-imparting welding method, in order to produce internal pipes.

Finally, U.S. Pat. No. 5,950,718 also discloses an entire spectrum of angles of inclination and also distances between the internal fins, but without considering the characteristics of the fins.

EP 1 525 289 B9 discloses a finned pipe for thermal cracking of hydrocarbons which has helical internal fins that are inclined relative to the pipe axis.

WO 2010/043375 A1 discloses a nickel-chromium-iron alloy having a high oxidation resistance and carburization resistance, rupture resistance and creep resistance, composed of 0.4% to 0.6% carbon, 28% to 33% chromium, 15% to 25% iron, 2% to 6% aluminum, up to 2% silicon, up to 2% manganese, up to 1.5% niobium, up to 1.5% tantalum, up to 1.0% tungsten, up to 1.0% titanium, up to 1.0% zirconium, up to 0.5% yttrium, up to 0.5% cerium, up to 0.5% molybdenum, up to 0.1% nitrogen, balance: nickel including melting-related impurities.

Against this background, it is an object of the invention to improve the economic viability of the thermal cracking of hydrocarbons in pipe furnaces with externally heated pipes.

It has been recognized that, in a pipe having the features of the preamble of claim 1, there is a relationship between the features that characterize the pipe, namely
- the number $N_T$ of grooves that have been introduced into the inner surface of the pipe and extend in a helix around the longitudinal axis along the inner surface,
- the diameter of the inner surface area into which the grooves have been introduced, in a cross section at right angles to the longitudinal axis,
- the radius $r_2$ of the groove base of the grooves that each have the form of a circular arc in their groove base and are at right angles in cross section to the longitudinal axis, and
- the groove depth TT of the grooves which, in the cross section at right angles to the longitudinal axis, corresponds in each case to the smallest distance between the circle having the diameter Di on which the inner surface lies and the center of which lies on the longitudinal axis, and the furthest removed point of the groove base of the groove from the longitudinal axis, which can be taken into account to improve the economic viability of the thermal cracking of hydrocarbons in pipe furnaces with externally heated pipes.

To wit, it has been recognized that it is possible to establish a characteristic value based on heat transfer considerations that can be calculated in two different ways, each of which, however, depends solely on the above-described features that characterize the pipe.

According to a first heat transfer consideration, this characteristic value can be expressed as $$P1*|D_{eqv}|^2 + P2*|D_{eqv}| + P3$$

with the constants P1, P2 and P3 and numerical value $|D_{eqv}|$ of the equivalent diameter $D_{eqv}$ which is dependent on the internal diameter Di measured in mm.

Good results are achieved when the constant P1 chosen is a number from the claimed range from −0.2 to −0.3. In a preferred embodiment, the constant P1 is selected from a range from −0.25 to −0.295, especially preferably from a range from −0.287 to −0.2655. Especially preferably, the constant P1 is equal to −0.287 or −0.2655.

Good results are achieved when the constant P2 chosen is a number from the claimed range from 310 to 315. In a preferred embodiment, the constant P2 is selected from a range from 310 to 312, especially preferably from a range from 310.42 to 311.31. Especially preferably, the constant P2 is equal to 310.42 or 311.31.

Good results are achieved when the constant P3 chosen is a number from the claimed range from 200 to 1500. In a preferred embodiment, the constant P3 is selected from a range from 230 to 1400, especially preferably from a range from 261.21 to 1076. Especially preferably, the constant P3 is equal to 261.21 or 1076.

The characteristic value used according to the invention for the configuration of the pipe is expressed in the aforementioned relationship as a function of the numerical value $|D_{eqv}|$ of the equivalent diameter $D_{eqv}$ which is dependent on the internal diameter Di measured in mm. The term "numerical value" in this context and in the rest of the documents is understood to mean the dimensionless number of a value of a physical parameter which is composed of the numerical value and the measurement unit. A physical parameter is a quantitative determinable property of a physical object, process or state. Its value (size) is reported as the product of a numerical value (the measured value) and a measurement unit. Since the relationships used according to the invention for the configuration of the pipe are dimensionless, the numerical value of the physical parameters is employed. In order to clarify this, the numerical value of a parameter is represented in the description and the claims by the nomenclature otherwise frequently used for the representation of a quantity, for example as $|D_{eqv}|$. The representation of a variable between two horizontal lines, for example $|D_{eqv}|$, is understood in the context of this description and the claims to be a representation of the numerical value of the value (size) of a physical parameter expressed by the variable. The numerical value $|Di|$ of a diameter Di expressed in mm of 70 mm is, for example, the number 70.

The characteristic value used for the configuration of the pipe according to the invention is expressed in the above relationship as a function of the numerical value $|D_{eqv}|$ of the equivalent diameter $D_{eqv}$ which is dependent on the internal diameter Di measured in mm. The equivalent diameter is the diameter of the inner surface area that would be possessed by a smooth, non-grooved pipe of passage area corresponding to the passage area of the pipe of the invention. Passage area is understood to mean the free area within the pipe in a cross section at right angles to the longitudinal axis. It has been found that heat transfer-based considerations can frequently be made more easily in a smooth pipe. It has also been found that users of the pipe of the invention, in their apparatuses for thermal cracking of hydrocarbons in the presence of steam, in which the feed mixture is guided through externally heated tubes, have in the past frequently worked with smooth pipes. For the changeover to the pipes of the invention, it is therefore easier if a comparison with the smooth pipe of corresponding passage area can be made.

The equivalent diameter $D_{eqv}$ is found via the relationship $D_{eqv} = 2\, r_{eqv}$ from the radius of the inner surface area that would have been possessed by a smooth, non-grooved pipe having a passage area corresponding to the passage area of the pipe of the invention. If the passage area $A_{eqv}$ of the smooth pipe ($A_{eqv} = \pi(r_{eqv})^2$) is equated to the passage area of the pipe of the invention, it is possible to express the passage area $A_{eqv}$ of the smooth pipe as follows in the features that characterize the pipe (the symbols used relate to a nomenclature as also elucidated by way of example in FIG. 5):

$$|r_{eqv}| = \left|\sqrt{\frac{|A_{eqv}|}{\pi}}\right|$$

$$A_{eqv} = A_1 + N_T \cdot A_T$$

$$A_1 = \pi \cdot |r_1|^2$$

$$A_T = \left[|r_2| \cdot \frac{b_2}{2} - \frac{s \cdot (|r_2| - (|TT| + h))}{2}\right] - \left[|r_1| \cdot \frac{b_1}{2} - \frac{s \cdot (|r_1| - h)}{2}\right]$$

$$b_1 = 2 \cdot |r_1| \cdot \arcsin\left(\frac{\sqrt{2 \cdot |r_1| \cdot \frac{|TT| - |TT|^2}{2 \cdot \left(|r_1| - \frac{2 \cdot |r_2|}{|r_2| + |TT|}\right)} - \left(\frac{|TT| - |TT|^2}{2 \cdot \left(|r_1| - \frac{2 \cdot |r_2|}{|r_2| + |TT|}\right)}\right)^2}}{|r_1|}\right)$$

$$b_2 = 2 \cdot |r_2| \cdot \arcsin\left(\frac{\sqrt{2 \cdot |r_1| \cdot \frac{|TT| - |TT|^2}{2 \cdot \left(|r_1| - \frac{2 \cdot |r_2|}{|r_2| + |TT|}\right)} - \left(\frac{|TT| - |TT|^2}{2 \cdot \left(|r_1| - \frac{2 \cdot |r_2|}{|r_2| + |TT|}\right)}\right)^2}}{|r_2|}\right)$$

$$s = 2 \cdot \left|\sqrt{2 \cdot |r_1| \cdot \frac{|TT| - |TT|^2}{2 \cdot \left(|r_1| - \frac{2 \cdot |r_2|}{|r_2| + |TT|}\right)} - \left(\frac{|TT| - |TT|^2}{2 \cdot \left(|r_1| - \frac{2 \cdot |r_2|}{|r_2| + |TT|}\right)}\right)^2}\right|$$

$$h = \frac{2 \cdot |r_2| \cdot |TT| - |TT|^2}{2 \cdot (|r_1| - |r_2| + |TT|)}$$

The passage area of the pipe of the invention that has been equated to the passage area $A_{eqv}$ of the smooth pipe is composed of the passage area $A_1$ bounded by the inner surface area into which the grooves have been introduced, which can be determined easily from the radius of the inner surface by $A_1 = \pi\, r_1^2$, and the additional areas that are provided by the number of $N_T$ grooves with their respective passage areas $A_T$.

After solving the above relationship, the passage area of the pipe of the invention that has been equated to the passage area $A_{eqv}$ of the smooth pipe can thus be expressed as follows exclusively with the features that characterize the pipe (also referred to hereinafter as formula (1)):

$$A_{eqv} = \pi \cdot |r_1|^2 +$$

$$N_T \cdot \left[ \left[ |r_2|^2 \cdot \arcsin\left( \frac{\sqrt{\left(2 \cdot |r_1| \cdot \frac{2 \cdot |r_2| \cdot \frac{|TT|-|TT|^2}{2 \cdot (|r_1|-|r_2|+|TT|)}}{|r_2|}\right) - \left(\frac{2 \cdot |r_2| \cdot \frac{|TT|-|TT|^2}{2 \cdot (|r_1|-|r_2|+|TT|)}}{|r_2|}\right)^2}}{|r_2|} \right) - \right.$$

$$\left. \sqrt{\left(2 \cdot |r_1| \cdot \frac{2 \cdot |r_2| \cdot \frac{|TT|-|TT|^2}{2 \cdot (|r_1|-|r_2|+|TT|)}}{|r_2|}\right) - \left(\frac{2 \cdot |r_2| \cdot \frac{|TT|-|TT|^2}{2 \cdot (|r_1|-|r_2|+|TT|)}}{|r_2|}\right)^2} \cdot \right.$$

$$\left. \left( |r_2| - \left( |TT| + \frac{2 \cdot |r_2| \cdot |TT|-|TT|^2}{2 \cdot (|r_1|-|r_2|+|TT|)} \right) \right) \right] - \left[ |r_1|^2 \cdot \right.$$

$$\arcsin\left( \frac{\sqrt{\left(2 \cdot |r_1| \cdot \frac{2 \cdot |r_2| \cdot \frac{|TT|-|TT|^2}{2 \cdot (|r_1|-|r_2|+|TT|)}}{|r_1|}\right) - \left(\frac{2 \cdot |r_2| \cdot \frac{|TT|-|TT|^2}{2 \cdot (|r_1|-|r_2|+|TT|)}}{|r_1|}\right)^2}}{|r_1|} \right) -$$

$$\sqrt{\left(2 \cdot |r_1| \cdot \frac{2 \cdot |r_2| \cdot \frac{|TT|-|TT|^2}{2 \cdot (|r_1|-|r_2|+|TT|)}}{|r_1|}\right) - \left(\frac{2 \cdot |r_2| \cdot \frac{|TT|-|TT|^2}{2 \cdot (|r_1|-|r_2|+|TT|)}}{|r_1|}\right)^2} \cdot$$

$$\left. \left( |r_1| - \frac{2 \cdot |r_2| \cdot |TT|-|TT|^2}{2 \cdot (|r_1|-|r_2|+|TT|)} \right) \right] \right]$$

According to a second heat transfer consideration, this characteristic value can be described as $$C1+C2*|TT|+C3*VD+C4*|D_{eqv}|+(|TT|-C5)*(VD-C6)*C7+(|TT|-C5)*(|D_{eqv}|-C8)*C9$$

or, taking account of further cross-linkages, as $$C1+C2*|TT|+C3*VD+C4*|D_{eqv}|+(|TT|-C5)*(VD-C6)*C7+(|TT|-C5)*(|D_{eqv}|-C8)*C9+(VD-C6)*(|D_{eqv}|-C8)*C10+(|D_{eqv}|-C8)*(|D_{eqv}|-C8)*C11$$

as a function of the numerical value $|D_{eqv}|$ of the equivalent diameter $D_{eqv}$ dependent on the internal diameter Di measured in mm, the number $N_T$ of grooves and the numerical value $|TT|$ of the groove depth TT measured in mm and the groove density VD which describes the ratio of the grooves $N_T$ in the pipe in relation to the reference number $N_{ref}$ of the maximum number of grooves having a groove depth TT=1.3 mm that can be introduced in the inner surface area of a pipe having the same equivalent diameter $D_{eqv}$. The constants here are fixed as follows:

C1=1946.066
C2=302.378
C3=−2.178
C4=266.002
C5=1.954
C6=50.495
C7=−2.004
C8=79.732
C9=−1.041
C10=0.04631
C11=−0.26550

It has been recognized that, if these two calculation methods for the characteristic value are equated, the relationship $$P1*|D_{eqv}|^2+P2*|D_{eqv}|+P3=C1+C2*|TT|+C3*VD+C4*|D_{eqv}|+(|TT|-C5)*(VD-C6)*C7+(|TT|-C5)*(|D_{eqv}|-C8)*C9$$

or, taking account of further cross-linkages, the relationship $$P1*|D_{eqv}|^2+P2*|D_{eqv}|+P3=C1+C2*|TT|+C3*VD+C4*|D_{eqv}|+(|TT|-C5)*(VD-C6)*C7+(|TT|-C5)*(|D_{eqv}|-C8)*C9+(VD-C6)*(|D_{eqv}|-C8)*C10+(|D_{eqv}|-C8)*(|D_{eqv}|-C8)*C11$$

is obtained as a description of the relationship of the pipe-characterizing features with one another, which characterize a pipe that improves the economic viability of the thermal cracking of hydrocarbons in pipe furnaces with externally heated pipes. The pipe-characterizing features to be used specifically for the pipe, namely the number $N_T$ of grooves that have been introduced into the inner surface of the pipe and extend in a helix around the longitudinal axis along the inner surface, the diameter of the inner surface area into which the grooves have been introduced, in a cross section at right angles to the longitudinal axis, the radius $r_2$ of the groove base of the grooves that each have the form of a circular arc in their groove base and are at right angles in cross section to the longitudinal axis, and the groove depth TT of the grooves which, in the cross section at right angles to the longitudinal axis, corresponds in each case to the smallest distance between the circle having the diameter Di on which the inner surface lies and the center of which lies on the longitudinal axis, and the furthest removed point of the groove base of the groove from the longitudinal axis, can be ascertained by simple iterations on the basis of this relationship. Every pair of these four pipe-characterizing features that satisfies this relationship constitutes a pipe that improves the economic viability of the thermal cracking of hydrocarbons in pipe furnaces with externally heated pipes.

In practice, it is found that the work associated with the iteration can in practice be reduced even further. For instance, findings for individual features among the four that characterize the pipe arise from stiffness or manufacturing restrictions or else from the need to manufacture the pipe with a particular passage area.

A maximum possible weight of the individual pipe that results from the plant in which the pipe is to be used may result in a restriction in respect of the maximum wall thickness of the pipe, which in turn results in a restriction in respect of the maximum producible groove depth TT from stiffness aspects. Restrictions in respect of wall thickness (and hence in respect of maximum producible groove depth) may also arise from other aspects, for example from the heat transfer to be achieved.

Stiffness considerations may also result in an upper limit in respect of the number $N_T$ of grooves that have been introduced into the inner surface of the pipe and extend in a helix around the longitudinal axis along the inner surface in combination with the groove depth TT. If an excessive number of excessively deep grooves is introduced, the stiffness of the pipe may be weakened excessively.

It is also possible that limits with regard to the radius $r_2$ of the circular arc of the groove base in combination with the groove depth TT will result from the tendency of the pipe to coking in the thermal cracking of hydrocarbons in the presence of steam, in which the feed mixture is guided through the externally heated pipes.

Moreover, restrictions arise from manufacturing aspects, for example with regard to the radius $r_2$ of the circular arc of the groove base in combination with the groove depth TT. The grooves may be produced, for example, by a deep-hole drilling method, for example in the manner described in the German patent application with application number 10 2016 012 907.7, which has been filed by the applicant but is yet to be published. This is done using indexable inserts for production of the grooves. These indexable inserts are available in fixed sizes. If—as is recommended for reasons of economic viability—the already obtainable indexable inserts are employed, dispensing with the likewise conceivable option of specifically manufacturing indexable inserts for the production of the specific pipe, this also results in settings for the radius $r_2$ of the circular arc of the groove base in combination with the groove depth TT. It may also be found to be the case that a pipe having a first number of grooves can be manufactured more quickly and at much lower cost than a pipe having a second, greater number of grooves compared to the first number, and so this too can result in a restriction in respect of the number of grooves to be introduced.

Restrictions can also arise from the fact that a certain throughput of feed mixture is required for the pipe and, therefore, a minimum passage area of the pipe.

The result is that, prior to the performance of the iteration, there are already ranges within which individual features among the four that characterize the pipe cannot lie and hence these can be ruled out in the iteration.

The above-described relationship $$C1+C2*|TT|+C3*VD+C4*|D_{eqv}|+(|TT|-C5)*(VD-C6)*C7+(|TT|-C5)*(|D_{eqv}|-C8)*C9$$

or the relationship that includes further cross-linkages $$C1+C2*|TT|+C3*VD+C4*|D_{eqv}|+(|TT|-C5)*(VD-C6)*C7+(|TT|-C5)*(|D_{eqv}|-C8)*C9+(VD-C6)*(|D_{eqv}|-C8)*C10+(|D_{eqv}|-C8)*(|D_{eqv}|-C8)*C11$$

refer to the groove density VD. The groove density VD is the ratio of the grooves $N_T$ in the pipe in relation to the reference number $N_{ref}$ of the maximum number of grooves having a groove depth TT=1.3 mm that can be introduced in the inner surface area of a pipe having the same equivalent diameter $D_{eqv}$ in percent.

The finding of the invention can be applied to pipes having a broad spectrum of diameters Di of the inner surface into which the grooves are introduced. It is obviously possible to introduce more grooves having a fixed radius $r_2$ of the circular arc in the groove base of the groove and a fixed groove depth TT into a pipe having greater diameter Di than into a pipe having small diameter Di. In order nevertheless to be able to state a relationship for all diameters, a normalization has been developed, in which what is introduced into the relationship is no longer the actual number of grooves $N_T$ but the groove density VD.

The groove density VD—since it is expressed in percent—is found from the relationship $$VD = N_T/N_{ref} * 100$$

where the reference number $N_{ref}$ is the greatest natural number at which the relationship $$N_{ref} \leq \frac{\pi}{\arcsin\left(\frac{\sqrt{\left[2 \cdot |r_{eqv}| \cdot \frac{2 \cdot |r_2| \cdot 1.3 - 1.3^2}{2 \cdot \frac{(|r_{eqv}|-}{|r_2|+1.3})} - \left(\frac{2 \cdot |r_2| \cdot 1.3 - 1.3^2}{2 \cdot \frac{(|r_{eqv}|-}{|r_2|+1.3})}\right)^2\right]}}{|r_{eqv}|}\right)}$$

is satisfied, where $A_{eqv}$ is the equivalent diameter calculated from the formula (1) and where $$|r_{eqv}| = \left|\sqrt{\frac{|A_{eqv}|}{\pi}}\right|$$

and in the case of which it is simultaneously possible to find an $r_{N_{ref}}$ to be determined by iteration which, with reference to the equivalent diameter $A_{eqv}$ calculated by formula (1), satisfies the following relationships (also referred to hereinafter as formula (2)):

$$A_{eqv} = \pi \cdot |r_{N_{ref}}|^2 +$$

$$N_{ref} \cdot \left[\left[|r_2|^2 \cdot \arcsin\left(\frac{\sqrt{\left[2 \cdot |r_{N_{ref}}| \cdot \frac{2 \cdot |r_2| \cdot 1.3 - 1.3^2}{2 \cdot \frac{(|r_{N_{ref}}|-}{|r_2|+1.3})} - \left(\frac{2 \cdot |r_2| \cdot 1.3 - 1.3^2}{2 \cdot \frac{(|r_{N_{ref}}|-}{|r_2|+1.3})}\right)^2\right]}}{|r_2|}\right)\right] -$$

$$\left|\sqrt{\left[2 \cdot |r_{N_{ref}}| \cdot \frac{2 \cdot |r_2| \cdot 1.3 - 1.3^2}{2 \cdot \frac{(|r_{N_{ref}}|-}{|r_2|+1.3})} - \left(\frac{2 \cdot |r_2| \cdot 1.3 - 1.3^2}{2 \cdot \frac{(|r_{N_{ref}}|-}{|r_2|+1.3})}\right)^2\right]}\right| \cdot$$

$$\left(|r_2| - \left(1.3 + \frac{2 \cdot |r_2| \cdot 1.3 - 1.3^2}{2 \cdot (|r_{N_{ref}}| - |r_2| + 1.3)}\right)\right) \Bigg] - \Big[|r_{N_{ref}}|^2 \cdot$$

$$\arcsin\left(\frac{\sqrt{\left[2 \cdot |r_{N_{ref}}| \cdot \frac{2 \cdot |r_2| \cdot 1.3 - 1.3^2}{2 \cdot \frac{(|r_{N_{ref}}|-}{|r_2|+1.3})} - \left(\frac{2 \cdot |r_2| \cdot 1.3 - 1.3^2}{2 \cdot \frac{(|r_{N_{ref}}|-}{|r_2|+1.3})}\right)^2\right]}}{|r_1|}\right) -$$

$$\left|\sqrt{\left[2 \cdot |r_{N_{ref}}| \cdot \frac{2 \cdot |r_2| \cdot 1.3 - 1.3^2}{2 \cdot \frac{(|r_{N_{ref}}|-}{|r_2|+1.3})} - \left(\frac{2 \cdot |r_2| \cdot 1.3 - 1.3^2}{2 \cdot \frac{(|r_{N_{ref}}|-}{|r_2|+1.3})}\right)^2\right]}\right| \cdot$$

-continued $$\left(\left|r_{N_{ref}}\right| - \frac{2 \cdot |r_2| \cdot 1.3 - 1.3^2}{2 \cdot \left(\left|r_{N_{ref}}\right| - |r_2| + 1.3\right)}\right)$$

with the secondary conditions $$\pi \geq N_{ref} \cdot \arcsin\left(\frac{\sqrt{\left(2 \cdot \left|r_{N_{ref}}\right| \cdot \frac{2 \cdot |r_2| \cdot \frac{1.3 - 1.3^2}{2 \cdot \frac{(|r_{N_{ref}}|-}{|r_2|+1.3)}} - \left(\frac{2 \cdot |r_2| \cdot \frac{1.3 - 1.3^2}{2 \cdot \frac{(|r_{N_{ref}}|-}{|r_2|+1.3)}}\right)^2\right)}}{\left|r_{N_{ref}}\right|}\right),$$

$$r_{N_{ref}} < r_{eqv}$$

$N_{ref}$ can be determined easily by the following sequence of steps:

In a first step, the right-hand side of the relationship $$N_{ref} \leq \frac{\pi}{\arcsin\left(\frac{\sqrt{\left(2 \cdot |r_{eqv}| \cdot \frac{2 \cdot |r_2| \cdot \frac{1.3 - 1.3^2}{2 \cdot \frac{(|r_{eqv}|-}{|r_2|+1.3)}} - \left(\frac{2 \cdot |r_2| \cdot \frac{1.3 - 1.3^2}{2 \cdot \frac{(|r_{eqv}|-}{|r_2|+1.3)}}\right)^2\right)}}{|r_{eqv}|}\right)}$$

is worked out using the values of the pipe which is to be examined for achievement of the advantages of the invention. Since $N_{ref}$ must be a natural number, the natural number corresponding to the calculated value is assumed when the calculated value is a natural number, or the smaller natural number closest to the calculated value. A pipe is taken as an example here with Di=60 mm, TT=2.05 mm, $r_2$=8 mm and $N_T$=8. This gives $N_{ref}$≤19.4967769. Thus, $N_{ref}$ is assumed to be 19 in the first step.

A second step checks whether it is possible with the $N_{ref}$ found in the first step to calculate an $r_{Nref}$ with which, referring to the equivalent diameter $A_{eqv}$ calculated by the formula (1), the formula (2) can be satisfied without infringing the secondary condition $$\pi \geq N_{ref} \cdot \arcsin\left(\frac{\sqrt{\left(2 \cdot \left|r_{N_{ref}}\right| \cdot \frac{2 \cdot |r_2| \cdot \frac{1.3 - 1.3^2}{2 \cdot \frac{(|r_{N_{ref}}|-}{|r_2|+1.3)}} - \left(\frac{2 \cdot |r_2| \cdot \frac{1.3 - 1.3^2}{2 \cdot \frac{(|r_{N_{ref}}|-}{|r_2|+1.3)}}\right)^2\right)}}{\left|r_{N_{ref}}\right|}\right),$$

$$r_{N_{ref}} < r_{eqv}$$

$A_{eqv}$ is worked out with the values of the pipe which is to be examined for achievement of the advantages of the invention, calculated by the formula (1). Given the aforementioned example values (Di=60 mm, TT=2.05 mm, $r_2$=8 mm and $N_T$=8), an $A_{eqv}$ of 2963.77397 mm² is found for the example values given. Therefore, the second step of the search for $N_{ref}$ examines whether it is possible with the $N_{ref}$ found in the first step to find an $r_{Nref}$ which, with the $A_{eqv}$ thus calculated, satisfies the formula (2) and, at the same time, the secondary conditions mentioned are met.

This iteration can easily be performed with a spreadsheet program, for example Microsoft® Excel and the "Goal Seek" function provided in such spreadsheet programs. An initially empty first cell is taken, which is then taken as the "variable cell" in the Goal Seek function. This cell is filled with any numerical value, for example $|r_1|$. Then the aforementioned equation for $A_{eqv}$, which expresses $A_{eqv}$ in terms of $r_{Nref}$, is input into a second cell, referring in respect of $r_{Nref}$ to the first cell filled with any numerical value, for example $|r_1|$, and taking the value of $r_2$ from the characteristic data of the pipe which is to be examined for achievement of the advantages of the invention.

In a third cell, the equation "=$A_{eqv}$-value from the second cell" is input, calculating the $A_{eqv}$ here by the formula (1).

The following equation is input in a fourth cell:

$$= \pi - N_{ref} \cdot \arcsin\left(\frac{\sqrt{\left(2 \cdot \left|r_{N_{ref}}\right| \cdot \frac{2 \cdot |r_2| \cdot \frac{1.3 - 1.3^2}{2 \cdot \frac{(|r_{N_{ref}}|-}{|r_2|+1.3)}} - \left(\frac{2 \cdot |r_2| \cdot \frac{1.3 - 1.3^2}{2 \cdot \frac{(|r_{N_{ref}}|-}{|r_2|+1.3)}}\right)^2\right)}}{\left|r_{N_{ref}}\right|}\right)$$

where $r_{Nref}$ refers to the first cell filled with any numerical value, for example $|r_1|$, and the value of $r_2$ is taken from the characteristic data of the pipe which is to be examined for achievement of the advantages of the invention. An IF-THEN test is then added in a fifth cell, which gives the output word "FALSE" if the value in the fourth cell is less than zero and otherwise gives the output word "TRUE".

With the spreadsheet thus prepared, it is then possible to start the Goal Seek function envisaged in the spreadsheet program. The Goal Seek function asks which is the target cell. The third cell is given as the input. The Goal Seek function also asks for the target value. This is input as 0 (zero). The Goal Seek function also asks for the variable cell. The first cell is given as the input. The Goal Seek function will lead to a value in the first cell. If the fifth cell contains "TRUE" for this value, the $N_{ref}$ found in the first step is the $N_{ref}$ to be used. If the value in the fifth cell is "FALSE", the $N_{ref}$ found in the first step is reduced by the number 1 and hence a new $N_{ref}$ is formed, with which the second step is conducted again. In general, even at the end of the Goal Seek function, this results in a value in the first cell for which the word "TRUE" is also present in the fifth cell, and so the new $N_{ref}$ thus obtained is the $N_{ref}$ to be used. Otherwise, the new $N_{ref}$ is once again reduced by the number 1 and the second step is conducted once again. It has been found that, even when such a Goal Seek function in a spreadsheet program is not perfect in terms of the later post-decimal places, this does not have any noticeable effect on the interpretation anyway owing to the remaining tolerances.

With the $N_{ref}$ thus found, for the pipe to be examined for achievement of the advantages of the invention, it is possible to determine the groove density VD from VD=100*$N_T$/$N_{ref}$. If it is confirmed with the values thus obtained that $$P1 \cdot |D_{eqv}|^2 + P2 \cdot |D_{eqv}| + P3 = C1 + C2 \cdot |TT| + C3 \cdot VD + C4 \cdot |D_{eqv}| + (|TT| - C5) \cdot (VD - C6) \cdot C7 + (|TT| - C5) \cdot (|D_{eqv}| - C8) \cdot C9$$

or, taking account of further cross-linkages, that $$P1*|D_{eqv}|^2+P2*|D_{eqv}|+P3=C1+C2*|TT|+C3*VD+\\C4*|D_{eqv}|+(|TT|-C5)*(VD-C6)*C7+(|TT|-C5)*\\(|D_{eqv}|-C8)*C11,$$

it is confirmed that the pipe with these four features characterizing the pipe ($N_T$, Di, $r_2$, TT), on which the calculation is based, improves the economic viability of the thermal cracking of hydrocarbons in pipe furnaces having externally heated pipes.

With the abovementioned example values (Di=60 mm, TT=2.05 mm, $r_2$=8 mm and $N_T$=8), an $N_{ref}$ of 19 is found in the first step. In the second step, the Goal Seek function with $N_{ref}$ of 19 gives an $r_{Nref}$ of 29.4509992. In the fourth cell, however, the value of −0.07096658 results, and so the word "FALSE" is the output in the fifth cell. If the $N_{ref}$ of 19 is reduced by the number 1 to 18 and the second step is conducted again, the Goal Seek function with $N_{ref}$ of 18 results in an $r_{Nref}$ of 29.5192908. In the fourth cell, however, the value 0.10620948 results, and so the word "TRUE" is the output in the fifth cell. $N_{ref}$=18 would be the value to use in the later examination of the pipe for compliance with the invention for the calculation of the groove density VD.

The pipe of the invention extends along a longitudinal axis and has grooves introduced into its inner surface. The number of grooves present is expressed by the variable $N_T$. The grooves extend in helical form around the longitudinal axis along the inner surface of the pipe. In a preferred embodiment, the grooves are distributed homogeneously over the circumference of the pipe. This means that, in any cross section at right angles to the longitudinal axis, for all grooves, the distance in circumferential direction between two grooves in an adjacent arrangement is the same for all grooves.

The groove depth is regarded as the distance of the lowest point in the groove from the inner surface. This means, in a cross section at right angles to the longitudinal axis, the shortest distance between the furthest removed point (lowest point) in the groove, viewed from the longitudinal axis in radial direction, and an inner surface circle around the longitudinal axis on which the portions of the inner surface arranged furthest inward that remain between the grooves lie. There are envisaged embodiments of the invention in which the inner surface of the pipe is cylindrical and the grooves are introduced into this cylindrical inner surface. In that case, portions of the inner surface that form parts of a cylinder remain between the grooves. The inner surface circle on which the portions of the inner surface arranged furthest inward lie—since all remaining portions of the inner surface in this embodiment are arranged the same distance inwards—is the circle in the cross section on which the remaining portions of the cylindrical inner surface lie. But there are also envisaged embodiments in which the inner surface remaining between two grooves shrinks virtually to a line because the groove opening (the opening cross section of the groove in the inner surface area) chosen is very large. Especially when, in such an embodiment, the curvature of the surface of the groove changes from a concave curvature in the groove base (a circular arc in the groove base) to a convex curvature of the surface of the groove in the region of the groove opening, the effect of such embodiments may be as if, in circumferential direction, grooves (in that case meaning the convex-curved region of the groove) were followed by fins arranged between the grooves (in that case meaning the concave-curved region of the groove) and the wall bounding the groove (or better: the concave-curved groove base) merged into an outer surface of the fin. The inner surface circle on which the portions of the inner surface arranged furthest inward do of course lie, in such embodiments, is the circle in the cross section on which the vertices of the "fins" in this cross section lie. The groove depth is expressed by the variable TT in the relationship that characterizes the pipe that has been found in accordance with the invention.

In a preferred embodiment, the grooves in a cross section at right angles to the longitudinal axis, at least in the groove base, have a rounded cross section that can preferably be approximated by a circular arc or corresponds to a circular arc. In the region of the groove opening, the cross-sectional geometry of the groove, in a preferred embodiment, can widen out, especially as a result of a change from a concave cross-sectional geometry in the groove base to a convex cross-sectional geometry in the region of the groove opening. In an alternative embodiment, in a cross section at right angles to the longitudinal axis, the cross-sectional geometry of the entire groove can be approximated by a circular arc or corresponds to a circular arc. Likewise conceivable are embodiments in which the groove in a cross section at right angles to the longitudinal axis has the cross-sectional geometry of a portion of an ellipse. In a preferred embodiment, the shape of the cross section of a groove at right angles to the longitudinal axis remains the same for all cross sections at right angles to the longitudinal axis. In a particularly preferred embodiment, the shape and size of the cross section of a groove at right angles to the longitudinal axis remains the same for all cross sections at right angles to the longitudinal axis. In a preferred embodiment, all grooves of the pipe have the same shape, and especially preferably the same shape and size, in a cross section at right angles to the longitudinal axis, preferably in all cross sections at right angles to the longitudinal axis. If the grooves have different sizes and especially different groove depths, the groove depth TT of the deepest groove is used for the relationship of the invention that characterizes the pipe.

In a preferred embodiment, a cross section of the pipe at right angles to the longitudinal axis is rotationally symmetric about the longitudinal axis. This means that there is at least one angle between 0° and 360° by which the cross section of the pipe can be mapped on itself by rotation about the longitudinal axis.

In a preferred embodiment, a cross section of the pipe at right angles to the longitudinal axis has point symmetry about the point occupied by the longitudinal axis in that cross section.

In a preferred embodiment, a cross section of the pipe at right angles to the longitudinal axis has mirror symmetry about an axis that runs at right angles to the longitudinal axis and lies in that cross section.

In a cross section at right angles to the longitudinal axis, the pipe has an internal diameter which is expressed by the variable Di. The internal diameter is the diameter of the inner surface circle, i.e. the circle around the longitudinal axis, on which the portions of the inner surface arranged furthest inward that remain between the grooves lie.

In a preferred embodiment, the pipe cross section on the inside has a diameter Di within a range from 15 mm to 280 mm, especially preferably from 15 mm to 180 mm, especially preferably from 20 mm to 150 mm and especially preferably from 30 mm to 140 mm.

In a preferred embodiment, the groove depth TT is within a range from 0.1 mm to 10 mm, especially preferably from 1.0 mm to 7 mm and most preferably from 1.0 mm to 4 mm.

In a preferred embodiment, the number of grooves $N_T$ is within a range from 1 to 100, especially preferably from 2 to 50 and most preferably from 2 to 30.

In a preferred embodiment, the groove density VD is within a range from 1% to 347%, especially preferably from 2% to 113% and most preferably from 10% to 105%.

In a preferred embodiment, the grooves run at an angle of 20° to 40°, preferably of 22.5° to 32.5°, based on the longitudinal axis.

In a preferred embodiment, in a cross section at right angles to the longitudinal axis, the circular arc segment in the inner surface circle occupied by a portion of the inner surface arranged between two grooves is greater than 1% of the circular arc segment in the inner surface circle occupied by the groove opening of at least one of the grooves adjoining this portion of the inner surface area, especially greater than 2%, especially greater than 5%, especially greater than 10%, especially greater than 30%, especially greater than 50%, especially greater than 70%. In a preferred embodiment, in a cross section, the circular arc segment in the inner surface circle occupied by the portion of the inner surface arranged between two grooves is equal to or greater than the circular arc segment in the inner surface circle occupied by the groove opening of at least one of the grooves adjoining this portion of the inner surface.

An apparatus of the invention for thermal cracking of hydrocarbons in the presence of steam, in which the feed mixture is guided through externally heated pipes, has at least one pipe of the invention.

In the pipe of the invention, the heat supply in the pipe wall and in the pipe interior which is inevitably different across the pipe circumference between the light side and dark side is balanced, and the heat is rapidly removed inward toward the core zone. This is associated with a reduction in the risk of local overheating of the process gas at the pipe wall and of the formation of coke caused thereby. Moreover, the thermal stress on the pipe material is lower owing to the temperature compensation between light side and dark side, which leads to an extension of lifetime. Finally, in the case of the pipe of the invention, there is also homogenization of the temperature across the pipe cross section with the result of a better olefin yield. The reason for this is that, without the radial temperature compensation of the invention in the interior of the pipe, there would be excess cracking at the hot pipe wall and too low a reaction conversion in the middle of the pipe.

The pipe of the invention, according to the material, can be produced, for example, from a centrifugally cast pipe by twisting the ends of a pipe with axially parallel grooves in opposite directions, or by generating the internal profile by preforming a centrifugally cast pipe, for example by hot forging, hot drawing or cold forming via a profile mold, for example a floating mandrel or a mandrel rod with an external profile corresponding to the internal profile of the pipe.

Cutting machines for internal profiling of pipes are known in various variants, for example from German patent specification 195 23 280. These machines are also suitable for production of a pipe of the invention.

The inner surface of the pipe of the invention should have minimum roughness; it may therefore have been smoothed, for example mechanically polished or electrolytically leveled.

Suitable pipe materials for use in ethylene plants include nickel-chromium-iron alloys with 0.1% to 0.5% carbon, 20% to 35% chromium, 20% to 70% nickel, up to 3% silicon, up to 1% niobium, up to 5% tungsten and additions of hafnium, titanium, rare earths, or zirconium, of up to 0.5% in each case, and up to 6% aluminum.

For the pipe, it is especially preferable to use a nickel-chromium-iron alloy having high oxidation resistance and carburization resistance, rupture resistance and creep resistance, composed of 0.05% to 0.6% carbon
20% to 50% chromium
5% to 40% iron
up to 6% aluminum
up to 2% silicon
up to 2% manganese
up to 1.5% niobium
up to 1.5% tantalum
up to 6.0% tungsten
up to 1.0% titanium
up to 1.0% zirconium
up to 0.5% yttrium
up to 0.5% cerium
up to 0.5% molybdenum
up to 0.1% nitrogen
balance: nickel including melting-related impurities.

The table below shows possible embodiments of the invention that conform to the proposed relationship of the invention. In one line, for a chosen internal diameter $D_{eqv}$, a pair $N_{TMax}$ and $TT_{min}$ and $VD_{max}$ is specified for a good heat transfer, but a lower heat transfer in relation to a second pair of $N_{Tmin}$ and $TT_{max}$ and $VD_{min}$. In addition, the table shows a heat transfer estimated by a simulation program ($H_{min}(D_{eqv}, TT_{min}, VD_{Max})$ [watts]) for the lower heat transfer; $H_{Max}(D_{eqv}, TT_{max}, VD_{min})$ [watts]) for the further-improved heat transfer).

| No. | $D_{eqv}$ | $N_{Tmax}$ | $VD_{max}$ | $TT_{min}$ | $H_{min}(D_{eqv}, TT_{min}, VD_{max})$ [watts] |
|---|---|---|---|---|---|
| 1 | 35 | 9 | 100 | 1.3 | 10831.95559 |
| 2 | 40 | 11 | 100 | 1.3 | 12288.96106 |
| 3 | 45 | 12 | 100 | 1.3 | 13732.69121 |
| 4 | 50 | 14 | 100 | 1.3 | 15163.14603 |
| 5 | 55 | 16 | 100 | 1.3 | 16580.32553 |
| 6 | 60 | 18 | 100 | 1.3 | 17984.2297 |
| 7 | 65 | 20 | 100 | 1.3 | 19374.85855 |
| 8 | 70 | 21 | 100 | 1.3 | 20752.21208 |
| 9 | 75 | 23 | 100 | 1.3 | 22116.29028 |
| 10 | 80 | 25 | 100 | 1.3 | 23467.09315 |
| 11 | 85 | 27 | 100 | 1.3 | 24804.62071 |
| 12 | 90 | 29 | 100 | 1.3 | 26128.87294 |
| 13 | 95 | 30 | 100 | 1.3 | 27439.84984 |
| 14 | 100 | 32 | 100 | 1.3 | 28737.55142 |
| 15 | 105 | 34 | 100 | 1.3 | 30021.97768 |
| 16 | 110 | 36 | 100 | 1.3 | 31293.12861 |
| 17 | 115 | 38 | 100 | 1.3 | 32551.00422 |
| 18 | 120 | 39 | 100 | 1.3 | 33795.6045 |
| 19 | 125 | 41 | 100 | 1.3 | 35026.92946 |
| 20 | 130 | 43 | 100 | 1.3 | 36244.9791 |
| 21 | 135 | 45 | 100 | 1.3 | 37449.75341 |
| 22 | 140 | 47 | 100 | 1.3 | 38641.25239 |
| 23 | 160 | 54 | 100 | 1.3 | 43274.4951 |
| 24 | 180 | 61 | 100 | 1.3 | 47695.33262 |
| 25 | 200 | 68 | 100 | 1.3 | 51903.76496 |
| 26 | 280 | 97 | 100 | 1.3 | 66613.44243 |

| No. | $D_{eqv}$ | $NT_{min}$ | $VD_{min}$ | $TT_{max}$ | $H_{max}(D_{eqv}, TT_{max}, VD_{min})$ [watts] |
|---|---|---|---|---|---|
| 27 | 35 | 3 | 33.33333333 | 2.7 | 11564.65262 |
| 28 | 40 | 3 | 27.27272727 | 2.7 | 13032.35209 |
| 29 | 45 | 3 | 25 | 2.7 | 14463.96054 |
| 30 | 50 | 3 | 21.42857143 | 2.7 | 15887.80079 |

-continued

| | | | | | |
|---|---|---|---|---|---|
| 31 | 55 | 3 | 18.75 | 2.7 | 17292.40888 |
| 32 | 60 | 3 | 16.66666667 | 2.7 | 18679.77042 |
| 33 | 65 | 3 | 15 | 2.7 | 20051.07678 |
| 34 | 70 | 3 | 14.28571429 | 2.7 | 21404.40771 |
| 35 | 75 | 3 | 13.04347826 | 2.7 | 22746.18795 |
| 36 | 80 | 3 | 12 | 2.7 | 24073.38983 |
| 37 | 85 | 3 | 11.11111111 | 2.7 | 25386.30292 |
| 38 | 90 | 3 | 10.34482759 | 2.7 | 26685.1369 |
| 39 | 95 | 3 | 10 | 2.7 | 27969.09023 |
| 40 | 100 | 3 | 9.375 | 2.7 | 29240.37497 |
| 41 | 105 | 3 | 8.823529412 | 2.7 | 30497.91084 |
| 42 | 110 | 3 | 8.333333333 | 2.7 | 31741.77677 |
| 43 | 115 | 3 | 7.894736842 | 2.7 | 32972.03508 |
| 44 | 120 | 3 | 7.692307692 | 2.7 | 34188.38764 |
| 45 | 125 | 3 | 7.317073171 | 2.7 | 35391.6438 |
| 46 | 130 | 3 | 6.976744186 | 2.7 | 36581.40387 |
| 47 | 135 | 3 | 6.666666667 | 2.7 | 37757.6973 |
| 48 | 140 | 3 | 6.382978723 | 2.7 | 38920.54851 |
| 49 | 160 | 3 | 5.555555556 | 2.7 | 43437.89962 |
| 50 | 180 | 3 | 4.918032787 | 2.7 | 47741.49693 |
| 51 | 200 | 3 | 4.411764706 | 2.7 | 51831.75693 |
| 52 | 280 | 3 | 3.092783505 | 2.7 | 66063.32146 |

Figure 4:
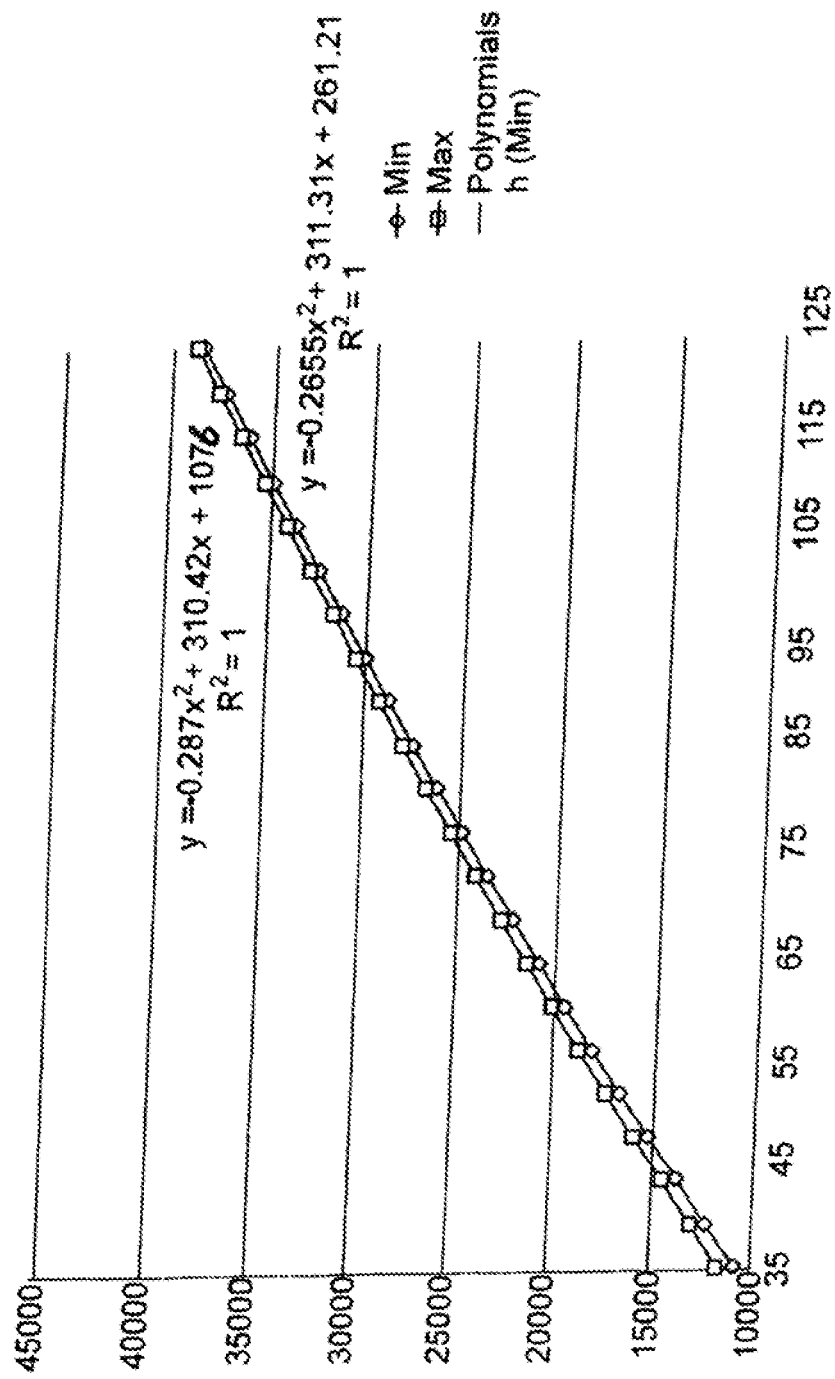

It has been recognized that the expected heat transfer, both for the good but slightly lower value in relation to the further-optimized value ($H_{min}(D_{eqv}, TT_{min}, VD_{Max})$ [watts]) and for the further-optimized value $H_{max}(D_{eqv}, TT_{max}, VD_{min})$ [watts]), can be plotted in direct proportion to the internal diameter, as shown in FIG. 4. The table below shows the values of the different variables of the relationships used in accordance with the invention for the individual pipes. The circular arc in the groove base had a radius $r_2$ of 8 mm.

| No. | $A_{eqv}$ | $A_1$ | $A_T$ | $r_1$ | $b_1$ | $b_2$ | s | h |
|---|---|---|---|---|---|---|---|---|
| 1 | 962.113 | 870.691 | 10.158 | 16.648 | 11.365 | 12.331 | 11.146 | 0.961 |
| 2 | 1256.637 | 1149.789 | 9.713 | 19.131 | 10.883 | 11.77 | 10.737 | 0.769 |
| 3 | 1590.431 | 1477.643 | 9.399 | 21.688 | 10.543 | 11.374 | 10.44 | 0.638 |
| 4 | 1963.495 | 1835.026 | 9.176 | 24.168 | 10.303 | 11.093 | 10.226 | 0.547 |
| 5 | 2375.829 | 2231.74 | 9.006 | 26.653 | 10.12 | 10.878 | 10.059 | 0.479 |
| 6 | 2827.433 | 2667.765 | 8.87 | 29.141 | 9.975 | 10.708 | 9.927 | 0.426 |
| 7 | 3318.307 | 3143.09 | 8.761 | 31.63 | 9.858 | 10.57 | 9.818 | 0.383 |
| 8 | 3848.451 | 3666.405 | 8.669 | 34.162 | 9.76 | 10.455 | 9.727 | 0.348 |
| 9 | 4417.865 | 4220.229 | 8.593 | 36.652 | 9.679 | 10.359 | 9.65 | 0.319 |
| 10 | 5026.548 | 4813.348 | 8.528 | 39.143 | 9.609 | 10.278 | 9.585 | 0.295 |
| 11 | 5674.502 | 5445.756 | 8.472 | 41.635 | 9.55 | 10.207 | 9.529 | 0.274 |
| 12 | 6361.725 | 6117.451 | 8.423 | 44.128 | 9.498 | 10.146 | 9.48 | 0.255 |
| 13 | 7088.218 | 6836.823 | 8.38 | 46.65 | 9.452 | 10.092 | 9.436 | 0.239 |
| 14 | 7853.982 | 7587.043 | 8.342 | 49.143 | 9.411 | 10.044 | 9.397 | 0.225 |
| 15 | 8659.015 | 8376.545 | 8.308 | 51.637 | 9.375 | 10.001 | 9.362 | 0.213 |
| 16 | 9503.318 | 9205.329 | 8.277 | 54.131 | 9.343 | 9.963 | 9.331 | 0.201 |
| 17 | 10386.891 | 10073.393 | 8.25 | 56.626 | 9.314 | 9.928 | 9.303 | 0.191 |
| 18 | 11309.734 | 10988.968 | 8.225 | 59.143 | 9.287 | 9.897 | 9.278 | 0.182 |
| 19 | 12271.846 | 11935.564 | 8.202 | 61.638 | 9.263 | 9.868 | 9.254 | 0.174 |
| 20 | 13273.229 | 12921.438 | 8.181 | 64.133 | 9.241 | 9.842 | 9.233 | 0.166 |
| 21 | 14313.882 | 13946.589 | 8.162 | 66.628 | 9.221 | 9.818 | 9.213 | 0.159 |
| 22 | 15393.804 | 15011.017 | 8.144 | 69.124 | 9.202 | 9.796 | 9.195 | 0.153 |
| 23 | 20106.193 | 19669.568 | 8.086 | 79.127 | 9.14 | 9.722 | 9.135 | 0.132 |
| 24 | 25446.9 | 24956.406 | 8.041 | 89.128 | 9.092 | 9.666 | 9.088 | 0.116 |
| 25 | 31415.927 | 30871.542 | 8.006 | 99.13 | 9.055 | 9.621 | 9.052 | 0.103 |
| 26 | 61575.216 | 60807.235 | 7.917 | 139.124 | 8.962 | 9.511 | 8.96 | 0.072 |
| 27 | 962.113 | 877.692 | 28.14 | 16.715 | 14.619 | 17.379 | 14.158 | 1.573 |
| 28 | 1256.637 | 1175.212 | 27.142 | 19.341 | 14.145 | 16.706 | 13.832 | 1.279 |
| 29 | 1590.431 | 1511.08 | 26.45 | 21.932 | 13.82 | 16.241 | 13.592 | 1.08 |
| 30 | 1963.495 | 1885.673 | 25.941 | 24.5 | 13.582 | 15.899 | 13.409 | 0.935 |
| 31 | 2375.829 | 2299.186 | 25.548 | 27.053 | 13.4 | 15.636 | 13.263 | 0.825 |
| 32 | 2827.433 | 2751.727 | 25.236 | 29.596 | 13.255 | 15.426 | 13.145 | 0.739 |
| 33 | 3318.307 | 3243.365 | 24.981 | 32.131 | 13.138 | 15.256 | 13.047 | 0.669 |
| 34 | 3848.451 | 3774.144 | 24.769 | 34.66 | 13.041 | 15.114 | 12.964 | 0.612 |
| 35 | 4417.865 | 4344.095 | 24.59 | 37.186 | 12.959 | 14.994 | 12.894 | 0.563 |
| 36 | 5026.548 | 4953.239 | 24.437 | 39.707 | 12.889 | 14.891 | 12.833 | 0.522 |
| 37 | 5674.502 | 5601.591 | 24.304 | 42.226 | 12.829 | 14.802 | 12.779 | 0.486 |
| 38 | 6361.725 | 6289.163 | 24.187 | 44.743 | 12.776 | 14.724 | 12.732 | 0.455 |
| 39 | 7088.218 | 7015.965 | 24.085 | 47.257 | 12.729 | 14.656 | 12.691 | 0.428 |
| 40 | 7853.982 | 7782.002 | 23.993 | 49.77 | 12.688 | 14.595 | 12.653 | 0.404 |
| 41 | 8659.015 | 8587.28 | 23.912 | 52.282 | 12.651 | 14.54 | 12.62 | 0.382 |
| 42 | 9503.318 | 9431.804 | 23.838 | 54.793 | 12.617 | 14.491 | 12.589 | 0.363 |
| 43 | 10386.891 | 10315.577 | 23.771 | 57.302 | 12.587 | 14.446 | 12.562 | 0.345 |
| 44 | 11309.734 | 11238.601 | 23.711 | 59.811 | 12.56 | 14.406 | 12.537 | 0.329 |
| 45 | 12271.846 | 12200.88 | 23.656 | 62.319 | 12.535 | 14.369 | 12.514 | 0.315 |
| 46 | 13273.229 | 13202.415 | 23.605 | 64.826 | 12.512 | 14.335 | 12.493 | 0.302 |
| 47 | 14313.882 | 14243.208 | 23.558 | 67.333 | 12.491 | 14.304 | 12.473 | 0.289 |
| 48 | 15393.804 | 15323.26 | 23.515 | 69.839 | 12.472 | 14.275 | 12.455 | 0.278 |
| 49 | 20106.193 | 20036.081 | 23.371 | 79.86 | 12.407 | 14.178 | 12.394 | 0.241 |
| 50 | 25446.9 | 25377.119 | 23.26 | 89.877 | 12.357 | 14.105 | 12.347 | 0.212 |
| 51 | 31415.927 | 31346.407 | 23.173 | 99.889 | 12.318 | 14.046 | 12.31 | 0.19 |
| 52 | 61575.216 | 61506.358 | 22.953 | 139.922 | 12.22 | 13.899 | 12.216 | 0.133 |

In the CFD analysis (computational fluid dynamics analysis) used for the estimation of the values ($H_{min}(D_{eqv}, TT_{min}, VD_{Max})$ [watts]) and $H_{max}(D_{eqv}, TT_{max}, VD_{min})$ [watts]), the following simulation conditions were used:

Boundary conditions for simulation of the heat transfer:
Temperature of the space for external heating of the pipes: 1300° C.
Emissivity E of the pipes: 0.85
Inclusion of light/dark sides (light side: 80% radiation 20% convection; dark side: 20% radiation 80% convection) and of the physical material properties of density, specific heat capacity and thermal conductivity as a function of temperature
Simulation length: 2 m

TABLE 1

State of the feed mixture at the pipe inlet

| Parameter | Value |
| --- | --- |
| Temperature, ° C. | 621 |
| Pressure, bar | 2 |
| Area-specific mass flow rate, g/(s · m²) | 52912.8 |

TABLE 2

Physical properties of the feed mixture

| Temperature ° C. | Density kg/m³ | Specific heat capacity kJ/kgK | Dynamic viscosity kg/ms | Thermal conductivity W/mK |
| --- | --- | --- | --- | --- |
| 620 | 0.87467615 | 2.81553015 | 2.941481E−05 | 0.08947538 |
| 630 | 0.86669998 | 2.82698110 | 2.974235E−05 | 0.09122076 |
| 640 | 0.85872380 | 2.83843205 | 3.006989E−05 | 0.09296613 |
| 650 | 0.85074763 | 2.84988300 | 3.039743E−05 | 0.09471151 |
| 660 | 0.84277145 | 2.86133395 | 3.072497E−05 | 0.09645688 |
| 670 | 0.83479528 | 2.87278490 | 3.105251E−05 | 0.09820226 |
| 680 | 0.82681910 | 2.88423585 | 3.138005E−05 | 0.09994763 |
| 690 | 0.81884293 | 2.89568680 | 3.170759E−05 | 0.10169301 |
| 700 | 0.81086675 | 2.90713775 | 3.203513E−05 | 0.10343838 |
| 710 | 0.80289058 | 2.91858870 | 3.236268E−05 | 0.10518376 |
| 720 | 0.79491440 | 2.93003965 | 3.269022E−05 | 0.10692913 |
| 730 | 0.78693823 | 2.94149060 | 3.301776E−05 | 0.10867451 |
| 740 | 0.77896205 | 2.95294155 | 3.334530E−05 | 0.11041988 |
| 750 | 0.77098588 | 2.96439250 | 3.367284E−05 | 0.11216526 |
| 760 | 0.76300970 | 2.97584345 | 3.400038E−05 | 0.11391063 |
| 770 | 0.75503353 | 2.98729440 | 3.432792E−05 | 0.11565601 |
| 780 | 0.74705735 | 2.99874535 | 3.465546E−05 | 0.11740138 |
| 790 | 0.73908118 | 3.01019630 | 3.498300E−05 | 0.11914676 |
| 800 | 0.73110500 | 3.02164725 | 3.531055E−05 | 0.12089213 |
| 810 | 0.72312883 | 3.03309820 | 3.563809E−05 | 0.12263751 |
| 820 | 0.71515265 | 3.04454915 | 3.596563E−05 | 0.12438288 |
| 830 | 0.70717648 | 3.05600010 | 3.629317E−05 | 0.12612826 |
| 840 | 0.69920030 | 3.06745105 | 3.662071E−05 | 0.12787363 |
| 850 | 0.69122413 | 3.07890200 | 3.694825E−05 | 0.12961901 |

The pipe of the invention is preferably used for thermal cracking of hydrocarbons in the presence of steam, in which the feed mixture is guided through externally heated pipes.

Figure 2:
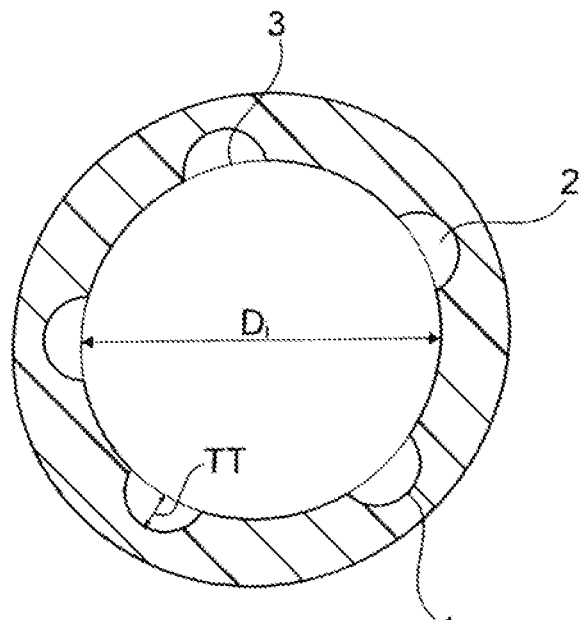
Figure 3:
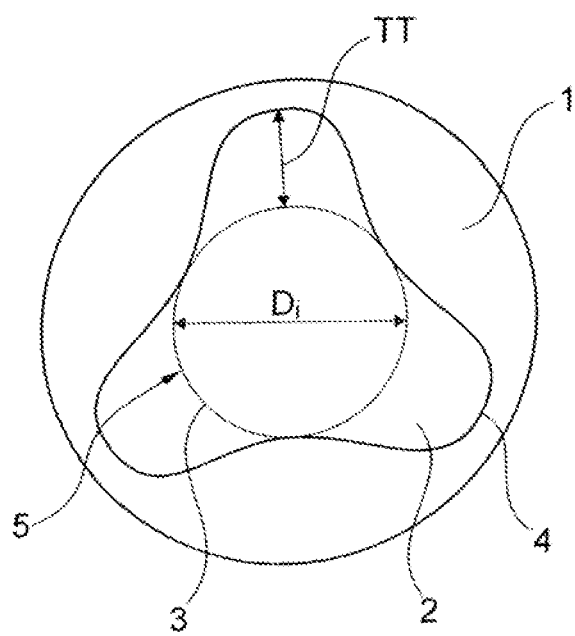

The invention is elucidated in detail by a drawing that shows merely embodiments of the invention. The figures show:

FIG. 1 a perspective view of a pipe of the invention,
FIG. 2 a first possible cross section of a pipe of the invention in a section plane at right angles to the longitudinal axis of the pipe,
FIG. 3 a second possible cross section of the invention in a section plane at right angles to the longitudinal axis of the pipe,
FIG. 4 a diagram that shows, for a pair of numbers $N_T$ of grooves and groove depths TT that leads to good results and for a pair of numbers $N_T$ of grooves and groove depths TT that leads to further-improved results, the dependence of the heat transfer achieved with this pair on the internal diameter and
FIG. 5 a cross section through a pipe of the invention with a groove.

The inventive pipe 1 shown in FIG. 1 extends along a longitudinal axis A and has a number of 3 grooves 2 introduced into the inner surface that extend in a helix around the longitudinal axis A along the inner surface.

In the cross section of the inventive pipe 1 shown in FIG. 2, it is apparent that, in a preferred embodiment, the grooves 2 are introduced into the otherwise cylindrical inner surface of the pipe 1. Between the grooves 2, there thus remain portions of the cylindrical inner surface of the pipe 1. Included in FIG. 2 is the groove depth TT and the diameter Di and the inner surface circle 3.

It is likewise shown in FIG. 2 that the cross section of the grooves 2 can be represented by a circular arc.

In the cross section of the inventive pipe 1 shown in FIG. 3, it is apparent that, in an alternative embodiment, the concave grooves in the groove base 4 can merge into a convex shape in the direction of the groove opening 5, and that the portion of the inner surface that remains between two grooves 2 shrinks virtually down to a line. Included in FIG. 3 is the groove depth TT and the diameter Di and the inner surface circle 3.

FIG. 4 shows the values of ($H_{min}(D_{eqv}, TT_{min}, VD_{max})$ [watts]) and $H_{Max}(D_{eqv}, TT_{max}, VD_{min})$ [watts]) that are reported in the table as a function of the equivalent diameter $D_{eqv}$. It is apparent that these values can be represented by a line in each case.

FIG. 5 and the detail Y shown in FIG. 5 show, by way of example, in an inventive pipe with a groove, the nomenclature of the abbreviations $A_1$, $r_1$, TT, h, $b_2$, $b_1$, $A_T$, $r_2$ and s used in the claims and this description.

The way in which the four values $N_T$, Di, $r_2$ and TT that characterize the pipe may be found can be shown by the examples that follow.

In one example, there is the external requirement that the passage area is to correspond to that of a smooth pipe of diameter 60 mm. In addition, from a manufacturing point of view, the tools usable for the manufacture of the pipe result in the restriction that a groove depth TT of 1.3 mm and a radius $r_2$ of the circular arc of the groove base of 8 mm is to be chosen in the case of grooves having a cross section in the shape of a circular arc. The question is what diameter Di and what number of grooves can improve the economic viability of the thermal cracking of hydrocarbons in pipe furnaces with externally heated pipes.

The starting point is thus:
$D_{eqv}$=60 mm
$A_{eqv}$=π(60/2)=2827.43 mm²
TT=1.3 mm
$r_2$=8 mm
$A_{eqv}$ directly gives $r_{eqv}$=$Di_{eqv}$/2=30 mm
$r_2$ and $r_{eqv}$ give, for the determination of the $N_{ref}$ in the first step by the formula $$N_{ref} \leq \frac{\pi}{\arcsin\left(\frac{\sqrt{2 \cdot |r_{eqv}| \cdot \frac{1.3 - 1.3^2}{2 \cdot (|r_{eqv}| - |r_2| + 1.3)} - \left(\frac{2 \cdot |r_2| \cdot \frac{1.3 - 1.3^2}{2 \cdot (|r_{eqv}| - |r_2| + 1.3)}\right)^2}}{|r_{eqv}|}\right)}$$

a first $N_{ref}$ of 18. With this $N_{ref}$ of 18, the above-described Goal Seek function gives an $r_{Nref}$ of 29.1406241, with which the secondary condition $$\pi \geq N_{ref} \cdot \arcsin\left(\frac{\sqrt{\left(2 \cdot |r_{Nref}| \cdot \frac{2 \cdot |r_2| \cdot \frac{1.3 - 1.3^2}{(|r_{Nref}|-)}}{2 \cdot \frac{(|r_{Nref}|-)}{|r_2|+1.3}}\right) - \left(\frac{2 \cdot |r_2| \cdot \frac{1.3 - 1.3^2}{(|r_{Nref}|-)}}{2 \cdot \frac{(|r_{Nref}|-)}{|r_2|+1.3}}\right)^2}}{|r_{Nref}|}\right),$$

$$r_{Nref} < r_{eqv}$$

is simultaneously fulfilled. The number 18 should thus be used as $N_{ref}$.

$N_{ref}=18$ gives $VD=N_T/18*100$.

Inserting the minimum values of P1, P2 and P3, for the left-hand term of the equation $$P1*|D_{eqv}|^2+P2*|D_{eqv}|+P3=C1+C2*|TT|+C3*VD+ C4*|D_{eqv}|+(|TT|-C5)*(VD-C6)*C7+(|TT|-C5)* (|D_{eqv}|-C8)*C9+(VD-C6)*(|D_{eqv}|-C8)*C10+ (|D_{eqv}|-C8)*(|D_{eqv}|-C8)*C11$$

with the constants
C1=1946.066
C2=302.378
C3=−2.178
C4=266.002
C5=1.954
C6=50.495
C7=−2.004
C8=79.732
C9=−1.041
C10=0.04631
C11=−0.26550
−0.2≥P1≥−0.3
310≤P2≤315
200≤P3≤1500
gives the value $$P1*|D_{eqv}|^2+P2*|D_{eqv}|+P3=-0.3*(60)^2+310*60+ 200=17720$$

and inserting the maximum values of P1, P2 and P3 gives, for the left-hand term of the equation, $$P1*|D_{eqv}|^2+P2*|D_{eqv}|+P3=-0.2*(60)^2+315*60+ 1500=19680$$

For the right-hand term of the equation $$C1+C2*|TT|+C3*VD+C4*|D_{eqv}|+(|TT|-C5)*(VD- C6)*C7+(|TT|-C5)*(|D_{eqv}|-C8)*C9+(VD-C6)* (|D_{eqv}|-C8)*C10+(|D_{eqv}|-C8)*(|D_{eqv}|-C8)*C11$$

inserting $|TT|=1.3$ and $|D_{eqv}|=60$ gives 1946.066+302.378*1.3+−2.178*VD+266.002*60+
(1.3−1.954)*(VD−50.495)*−2.004+(1.3−1.954)*
(60−79.732)*−1.041+(VD−50.495)*(60−79.732)
*0.04631+(60−79.732)*(60−79.732)*−0.26550 and so:

18162.4329−1.7812VD and with $VD=N_T/N_{ref}*100=N_T/18*100=5.5556$ $N_T$ the result is 18162.4329−9.8954$N_T$ In order to ensure that the pipe achieves the advantages of the invention, $N_T$ should be chosen such that the relationship

19680≥18162.4329−9.8954$N_T$ and the relationship 18162.4329−9.8954$N_T$≥17720 are fulfilled. Both relationships would be fulfilled with 1≤$N_T$≤44.71.

Since the $N_T$ thus found is greater than the previously calculated parameter $N_{ref}$, even in the case of introduction of the maximum possible number of grooves ($N_{ref}$=18), the advantages of the invention can still be achieved at this valley depth. The user is thus at liberty in this working example to endow the pipe with up to the maximum possible number of grooves without losing the advantages of the invention.

The $N_T$ thus found can be used to iteratively determine the radius $r_1$ of the pipe and hence the internal diameter Di (=2 $r_1$) of the pipe using the formula (1), since $A_{eqv}$=2827.43 mm².

Therefore, it is possible to determine all the parameters needed for the manufacture of the pipe that implements the benefits of the invention.

The invention claimed is:

1. A pipe for thermal cracking of hydrocarbons in the presence of steam, in which a feed mixture is guided through externally heated pipes, wherein
   the pipe (1) extends along a longitudinal axis (A) and has a number $N_T$ of grooves (2) that have been introduced into the inner surface of the pipe (1) and extend in a helix around the longitudinal axis (A) along the inner surface,
   the inner surface into which the grooves (2) have been introduced, in a cross section at right angles to the longitudinal axis (A), has a diameter Di and a radius $r_1$=Di/2,
   the grooves (2) in the cross section at right angles to the longitudinal axis (A), in their groove base (4), each have the form of a circular arc and the circular arc has a radius $r_2$,
   the grooves (2) each have a groove depth TT which, in the cross section at right angles to the longitudinal axis (A), corresponds in each case to the smallest distance between the circle having the diameter Di on which the inner surface lies and the center of which lies on the longitudinal axis (A), and the furthest removed point of the groove base (4) of the groove (2) from the longitudinal axis (A), wherein the numerical value $|D_{eqv}|$ of an equivalent diameter $D_{eqv}$ and the number $N_T$ of grooves (2) and the numerical value $|TT|$ of the groove depth TT of the grooves (2) measured in mm satisfy the relationship $$P1*|D_{eqv}|^2+P2*|D_{eqv}|+P3=C1+C2*|TT|+C3*VD+ C4*|D_{eqv}|+(|TT|-C5)*(VD-C6)*C7+(|TT|-C5)* (|D_{eqv}|-C8)*C9$$

with the constants
C1=1946.066
C2=302.378
C3=−2.178
C4=266.002
C5=1.954
C6=50.495
C7=−2.004
C8=79.732
C9=−1.041
C10=0.04631
C11=−0.26550

$-0.2 \geq P1 \geq -0.3$ $310 \leq P2 \leq 315$ $200 \leq P3 \leq 1500$ where the groove density VD that describes the ratio of the grooves $N_T$ in the pipe in relation to the reference number $N_{ref}$ of the maximum number of grooves having a groove depth TT=1.3 mm that can be introduced in the inner surface area of a pipe having the same equivalent diameter $D_{eqv}$, in percent is found from the following relationship:

$$VD = N_T/N_{ref} * 100$$

and the reference number $N_{ref}$ is the greatest natural number that satisfies the relationship $$N_{ref} \leq \frac{\pi}{\arcsin\left(\frac{\sqrt{\left[2 \cdot |r_{eqv}| \cdot \frac{2 \cdot |r_2| \cdot \frac{1.3 - 1.3^2}{2 \cdot \frac{(|r_{eqv}| - |r_2| + 1.3)}{}}} - \left(\frac{2 \cdot |r_2| \cdot \frac{1.3 - 1.3^2}{2 \cdot \frac{(|r_{eqv}| - |r_2| + 1.3)}{}}}\right)^2\right]}}{|r_{eqv}|}\right)} \text{ where}$$

$$|r_{eqv}| = \sqrt{\left|\frac{A_{eqv}}{\pi}\right|}$$

$$A_{eqv} = A_1 + N_T \cdot A_T$$

$$A_1 = \pi \cdot |r_1|^2$$

$$A_T = \left[|r_2| \cdot \frac{b_2}{2} - \frac{s \cdot (|r_2| - (|TT| + h))}{2}\right] - \left[|r_1| \cdot \frac{b_1}{2} - \frac{s \cdot (|r_1| - h)}{2}\right]$$

$$b_1 = 2 \cdot |r_1| \cdot \arcsin\left(\frac{\sqrt{\left[2 \cdot |r_1| \cdot \frac{2 \cdot |r_2| \cdot |TT| - |TT|^2}{2 \cdot (|r_1| - |r_2| + |TT|)} - \left(\frac{2 \cdot |r_2| \cdot |TT| - |TT|^2}{2 \cdot (|r_1| - |r_2| + |TT|)}\right)^2\right]}}{|r_1|}\right)$$

$$b_2 = 2 \cdot |r_2| \cdot \arcsin\left(\frac{\sqrt{\left[2 \cdot |r_1| \cdot \frac{2 \cdot |r_2| \cdot |TT| - |TT|^2}{2 \cdot (|r_1| - |r_2| + |TT|)} - \left(\frac{2 \cdot |r_2| \cdot |TT| - |TT|^2}{2 \cdot (|r_1| - |r_2| + |TT|)}\right)^2\right]}}{|r_2|}\right)$$

$$s = 2 \cdot \left|\sqrt{2 \cdot |r_1| \cdot \frac{2 \cdot |r_2| \cdot |TT| - |TT|^2}{2 \cdot (|r_1| - |r_2| + |TT|)} - \left(\frac{2 \cdot |r_2| \cdot |TT| - |TT|^2}{2 \cdot (|r_1| - |r_2| + |TT|)}\right)^2}\right|$$

$$h = \frac{2 \cdot |r_2| \cdot |TT| - |TT|^2}{2 \cdot (|r_1| - |r_2| + |TT|)}$$

and for which there is an $r_{N_{ref}}$ which, with reference to the value of $A_{eqv}$ ascertained by the above relationship, satisfies the following conditions that $A_{eqv}$ is likewise $$A_{eqv} = \pi \cdot |r_{N_{ref}}|^2 +$$

$$N_{ref} \cdot \left[|r_2|^2 \cdot \arcsin\left(\frac{\sqrt{\left[2 \cdot |r_{N_{ref}}| \cdot \frac{2 \cdot |r_2| \cdot \frac{1.3 - 1.3^2}{2 \cdot \frac{(|r_{N_{ref}}| - |r_2| + 1.3)}{}}} - \left(\frac{2 \cdot |r_2| \cdot \frac{1.3 - 1.3^2}{2 \cdot \frac{(|r_{N_{ref}}| - |r_2| + 1.3)}{}}}\right)^2\right]}}{|r_2|}\right) - \right.$$

-continued $$\left|\sqrt{2 \cdot |r_{N_{ref}}| \cdot \frac{2 \cdot |r_2| \cdot \frac{1.3 - 1.3^2}{2 \cdot \frac{(|r_{N_{ref}}| - |r_2| + 1.3)}{}}} - \left(\frac{2 \cdot |r_2| \cdot \frac{1.3 - 1.3^2}{2 \cdot \frac{(|r_{N_{ref}}| - |r_2| + 1.3)}{}}}\right)^2}\right| \cdot$$

$$\left(|r_2| - \left(1.3 + \frac{2 \cdot |r_2| \cdot 1.3 - 1.3^2}{2 \cdot (|r_{N_{ref}}| - |r_2| + 1.3)}\right)\right)\right] - \left[|r_{N_{ref}}|^2 \cdot$$

$$\left.\arcsin\left(\frac{\sqrt{\left[2 \cdot |r_{N_{ref}}| \cdot \frac{2 \cdot |r_2| \cdot \frac{1.3 - 1.3^2}{2 \cdot \frac{(|r_{N_{ref}}| - |r_2| + 1.3)}{}}} - \left(\frac{2 \cdot |r_2| \cdot \frac{1.3 - 1.3^2}{2 \cdot \frac{(|r_{N_{ref}}| - |r_2| + 1.3)}{}}}\right)^2\right]}}{|r_2|}\right) - \right.$$

$$\left.\left|\sqrt{2 \cdot |r_{N_{ref}}| \cdot \frac{2 \cdot |r_2| \cdot \frac{1.3 - 1.3^2}{2 \cdot \frac{(|r_{N_{ref}}| - |r_2| + 1.3)}{}}} - \left(\frac{2 \cdot |r_2| \cdot \frac{1.3 - 1.3^2}{2 \cdot \frac{(|r_{N_{ref}}| - |r_2| + 1.3)}{}}}\right)^2}\right|\right]$$

without infringing the boundary conditions $$\pi \geq N_{ref} \cdot \arcsin\left(\frac{\sqrt{\left[2 \cdot |r_{N_{ref}}| \cdot \frac{2 \cdot |r_2| \cdot \frac{1.3 - 1.3^2}{2 \cdot \frac{(|r_{N_{ref}}| - |r_2| + 1.3)}{}}} - \left(\frac{2 \cdot |r_2| \cdot \frac{1.3 - 1.3^2}{2 \cdot \frac{(|r_{N_{ref}}| - |r_2| + 1.3)}{}}}\right)^2\right]}}{|r_{N_{ref}}|}\right),$$

$$r_{N_{ref}} < r_{eqv}$$

and where the equivalent diameter $D_{eqv}$ is found from the relationship $D_{eqv} = 2 r_{eqv}$.

2. A pipe for thermal cracking of hydrocarbons in the presence of steam, in which a feed mixture is guided through externally heated pipes, wherein the pipe (1) extends along a longitudinal axis (A) and has a number $N_T$ of grooves (2) that have been introduced into the inner surface of the pipe (1) and extend in a helix around the longitudinal axis (A) along the inner surface, the inner surface into which the grooves (2) have been introduced, in a cross section at right angles to the longitudinal axis (A), has a diameter Di and a radius $r_1$=Di/2, the grooves (2) in the cross section at right angles to the longitudinal axis (A), in their groove base (4), each have the form of a circular arc and the circular arc has a radius $r_2$, the grooves (2) each have a groove depth TT which, in the cross section at right angles to the longitudinal axis (A), corresponds in each case to the smallest distance between the circle having the diameter Di on which the inner surface lies and the center of which lies on the longitudinal axis (A), and the furthest removed point of the groove base (4) of the groove (2) from the longitudinal axis (A), wherein the numerical value $|D_{eqv}|$ of an equivalent diameter $D_{eqv}$ and the number $N_T$ of grooves (2) and the numerical value $|TT|$ of the groove depth TT of the grooves (2) measured in mm satisfy the relationship $$P1*|D_{eqv}|^2+P2*|D_{eqv}|+P3=C1+C2*|TT|+C3*VD+C4*|D_{eqv}|+(|TT|-C5)*(VD-C6)*C7+(|TT|-C5)*(|D_{eqv}|-C8)*C9+(VD-C6)*(|D_{eqv}|-C8)*C10+(|D_{eqv}|-C8)*(|D_{eqv}|-C8)*C11$$

with the constants
 C1=1946.066
 C2=302.378
 C3=−2.178
 C4=266.002
 C5=1.954
 C6=50.495
 C7=−2.004
 C8=79.732
 C9=−1.041
 010=0.04631
 C11=−0.26550
 −0.2≥P1≥−0.3
 310≤P2≤315
 200≤P3≤1500, where the groove density VD that describes the ratio of the grooves $N_T$ in the pipe in relation to the reference number $N_{ref}$ of the maximum number of grooves having a groove depth TT=1.3 mm that can be introduced in the inner surface area of a pipe having the same equivalent diameter $D_{eqv}$, in percent is found from the following relationship:

$$VD = N_T/N_{ref}*100$$

and the reference number $N_{ref}$ is the greatest natural number that satisfies the relationship $$N_{ref} \leq \frac{\pi}{\arcsin\left(\frac{\sqrt{2\cdot|r_{eqv}|\cdot\frac{1.3-1.3^2}{2\cdot\left(|r_{eqv}|-\frac{|r_2|+1.3}{}\right)} - \left(\frac{2\cdot|r_2|\cdot}{2\cdot\left(|r_{eqv}|-\frac{|r_2|+1.3}{}\right)}\right)^2}}{|r_{eqv}|}\right)}$$ where $$|r_{eqv}| = \sqrt{\frac{|A_{eqv}|}{\pi}}$$

$$A_{eqv} = A_1 + N_T \cdot A_T$$

$$A_1 = \pi \cdot |r_1|^2$$

$$A_T = \left[|r_2|\cdot\frac{b_2}{2} - \frac{s\cdot(|r_2|-(|TT|+h))}{2}\right] - \left[|r_1|\cdot\frac{b_1}{2} - \frac{s\cdot(|r_1|-h)}{2}\right]$$

$$b_1 = 2\cdot|r_1|\cdot\arcsin\left(\frac{\sqrt{2\cdot|r_1|\cdot\frac{2\cdot|r_2|\cdot|TT|-|TT|^2}{2\cdot(|r_1|-|r_2|+|TT|)} - \left(\frac{2\cdot|r_2|\cdot|TT|-|TT|^2}{2\cdot(|r_1|-|r_2|+|TT|)}\right)^2}}{|r_1|}\right)$$

$$b_2 = 2\cdot|r_2|\cdot\arcsin\left(\frac{\sqrt{2\cdot|r_1|\cdot\frac{2\cdot|r_2|\cdot|TT|-|TT|^2}{2\cdot(|r_1|-|r_2|+|TT|)} - \left(\frac{2\cdot|r_2|\cdot|TT|-|TT|^2}{2\cdot(|r_1|-|r_2|+|TT|)}\right)^2}}{|r_2|}\right)$$

$$s = 2\cdot\left|\sqrt{2\cdot|r_1|\cdot\frac{2\cdot|r_2|\cdot|TT|-|TT|^2}{2\cdot(|r_1|-|r_2|+|TT|)} - \left(\frac{2\cdot|r_2|\cdot|TT|-|TT|^2}{2\cdot(|r_1|-|r_2|+|TT|)}\right)^2}\right|$$

$$h = \frac{2\cdot|r_2|\cdot|TT|-|TT|^2}{2\cdot(|r_1|-|r_2|+|TT|)}$$

and for which there is an $r_{N_{ref}}$ which, with reference to the value of $A_{eqv}$ ascertained by the above relationship, satisfies the following conditions that $A_{eqv}$ is likewise $$A_{eqv} = \pi\cdot|r_{N_{ref}}|^2 +$$

$$N_{ref}\cdot\left[\left[|r_2|^2\cdot\arcsin\left(\frac{\sqrt{2\cdot|r_{N_{ref}}|\cdot\frac{2\cdot|r_2|\cdot\frac{1.3-1.3^2}{2\cdot\left(|r_{N_{ref}}|-\frac{|r_2|+1.3}{}\right)} - \left(\frac{2\cdot|r_2|\cdot\frac{1.3-1.3^2}{2\cdot\left(|r_{N_{ref}}|-\frac{|r_2|+1.3}{}\right)}}{}\right)^2}}{|r_2|}\right)-\right.\right.$$

$$\left.\sqrt{2\cdot|r_{N_{ref}}|\cdot\frac{2\cdot|r_2|\cdot\frac{1.3-1.3^2}{2\cdot\left(|r_{N_{ref}}|-\frac{|r_2|+1.3}{}\right)} - \left(\frac{2\cdot|r_2|\cdot\frac{1.3-1.3^2}{2\cdot\left(|r_{N_{ref}}|-\frac{|r_2|+1.3}{}\right)}}{}\right)^2}}\cdot$$

$$\left.\left(|r_2|-\left(1.3+\frac{2\cdot|r_2|\cdot 1.3-1.3^2}{2\cdot\left(|r_{N_{ref}}|-|r_2|+1.3\right)}\right)\right)\right]-\left[|r_{N_{ref}}|^2\cdot\right.$$

$$\arcsin\left(\frac{\sqrt{2\cdot|r_{N_{ref}}|\cdot\frac{2\cdot|r_2|\cdot\frac{1.3-1.3^2}{2\cdot\left(|r_{N_{ref}}|-\frac{|r_2|+1.3}{}\right)} - \left(\frac{2\cdot|r_2|\cdot\frac{1.3-1.3^2}{2\cdot\left(|r_{N_{ref}}|-\frac{|r_2|+1.3}{}\right)}}{}\right)^2}}{|r_2|}\right)-$$

$$\left.\sqrt{2\cdot|r_{N_{ref}}|\cdot\frac{2\cdot|r_2|\cdot\frac{1.3-1.3^2}{2\cdot\left(|r_{N_{ref}}|-\frac{|r_2|+1.3}{}\right)} - \left(\frac{2\cdot|r_2|\cdot\frac{1.3-1.3^2}{2\cdot\left(|r_{N_{ref}}|-\frac{|r_2|+1.3}{}\right)}}{}\right)^2}}\right]$$

without infringing the boundary conditions $$\pi \geq N_{ref}\cdot\arcsin\left(\frac{\sqrt{2\cdot|r_{N_{ref}}|\cdot\frac{2\cdot|r_2|\cdot\frac{1.3-1.3^2}{2\cdot\left(|r_{N_{ref}}|-\frac{|r_2|+1.3}{}\right)} - \left(\frac{2\cdot|r_2|\cdot\frac{1.3-1.3^2}{2\cdot\left(|r_{N_{ref}}|-\frac{|r_2|+1.3}{}\right)}}{}\right)^2}}{|r_{N_{ref}}|}\right),$$

$$r_{N_{ref}} < r_{eqv}$$

and where the equivalent diameter $D_{eqv}$, is found from the relationship $D_{eqv}=2\,r_{eqv}$.

3. The pipe as claimed in claim 1, wherein the inner surface of the pipe is cylindrical and the grooves are introduced into this cylindrical inner surface in such a way that portions of the inner surface that form a cylinder remain between the grooves.

4. The pipe as claimed in claim 1, wherein, in a cross section at right angles to the longitudinal axis, the circular arc segment in the inner surface circle occupied by a portion of the inner surface arranged between two grooves is greater than 1% of the circular arc segment in the inner surface circle occupied by the groove opening of at least one of the grooves adjoining this portion of the inner surface area.

5. The pipe as claimed in claim 1, wherein the diameter Di of the inner surface into which the grooves (2) have been introduced is within a range from 15 mm to 280 mm.

6. The pipe as claimed in claim 1, wherein the groove depth TT is within a range from 0.1 mm to 10 mm.

7. The pipe as claimed in claim 1, wherein the number $N_T$ of grooves (2) results in a groove density within a range from 1% to 347%.

8. The pipe as claimed in claim 1, wherein the grooves (2) run at an angle of 20° to 40°, preferably of 22.5° to 32.5°, based on the longitudinal axis (A).

9. The pipe as claimed in claim 1, wherein the pipe is a centrifugally cast pipe or has been produced from a centrifugally cast pipe by introducing grooves into a centrifugally cast pipe.

10. The pipe as claimed in claim 1, wherein the pipe includes a nickel-chromium-iron alloy having high oxidation and carburization resistance, rupture resistance and creep resistance, composed of
   0.05% to 0.6% carbon
   20% to 50% chromium
   5% to 40% iron
   2% to 6% aluminum
   up to 2% silicon
   up to 2% manganese
   up to 1.5% niobium
   up to 1.5% tantalum
   up to 6.0% tungsten
   up to 1.0% titanium
   up to 1.0% zirconium
   up to 0.5% yttrium
   up to 0.5% cerium
   up to 0.5% molybdenum
   up to 0.1% nitrogen
   balance: nickel including melting-related impurities, and especially consists of such an alloy.

11. An apparatus for thermal cracking of hydrocarbons in the presence of steam, in which a feed mixture is guided through externally heated pipes, wherein for at least one of said pipes,
   the pipe (1) extends along a longitudinal axis (A) and has a number $N_T$ of grooves (2) that have been introduced into the inner surface of the pipe (1) and extend in a helix around the longitudinal axis (A) along the inner surface,
   the inner surface into which the grooves (2) have been introduced, in a cross section at right angles to the longitudinal axis (A), has a diameter Di and a radius $r_1 = Di/2$,
   the grooves (2) in the cross section at right angles to the longitudinal axis (A), in their groove base (4), each have the form of a circular arc and the circular arc has a radius $r_2$,
   the grooves (2) each have a groove depth TT which, in the cross section at right angles to the longitudinal axis (A), corresponds in each case to the smallest distance between the circle having the diameter Di on which the inner surface lies and the center of which lies on the longitudinal axis (A), and the furthest removed point of the groove base (4) of the groove (2) from the longitudinal axis (A), wherein the numerical value $|D_{eqv}|$ of an equivalent $D_{eqv}$ and the number $N_T$ of grooves (2) and the numerical value $|TT|$ of the groove depth TT of the grooves (2) measured in mm satisfy the relationship $$P1*|D_{eqv}|^2 + P2*|D_{eqv}| + P3 = C1 + C2*|TT| + C3*VD + C4*|D_{eqv}| + (|TT|-C5)*(VD-C6)*C7 + (|TT|-C5)*(|D_{eqv}|-C8)*C9$$

with the constants
   C1=1946.066
   C2=302.378
   C3=−2.178
   C4=266.002
   C5=1.954
   C6=50.495
   C7=−2.004
   C8=79.732
   C9=−1.041
   C10=0.04631
   C11=−0.26550
   −0.2≥P1≥−0.3
   310≤P2≤315
   200≤P3≤1500, where the groove density VD that describes the ratio of the grooves $N_T$ in the pipe in relation to the reference number $N_{ref}$ of the maximum number of grooves having a groove depth TT=1.3 mm that can be introduced in the inner surface area of a pipe having the same equivalent diameter $D_{eqv}$ in percent is found from the following relationship:

$$VD = N_T / N_{ref} * 100$$

and the reference number $N_{ref}$ is the greatest natural number that satisfies the relationship $$N_{ref} \leq \frac{\pi}{\arcsin\left(\frac{\sqrt{2 \cdot |r_{eqv}| \cdot \frac{2 \cdot |r_2| \cdot 1.3 - 1.3^2}{2 \cdot (|r_{eqv}| - |r_2| + 1.3)} - \left(\frac{2 \cdot |r_2| \cdot 1.3 - 1.3^2}{2 \cdot (|r_{eqv}| - |r_2| + 1.3)}\right)^2}}{|r_{eqv}|}\right)} \text{ where}$$

$$|r_{eqv}| = \sqrt{\left|\frac{|A_{eqv}|}{\pi}\right|}$$

$$A_{eqv} = A_1 + N_T \cdot A_T$$

$$A_1 = \pi \cdot |r_1|^2$$

$$A_T = \left[|r_2| \cdot \frac{b_2}{2} - \frac{s \cdot (|r_2| - (|TT| + h))}{2}\right] - \left[|r_1| \cdot \frac{b_1}{2} - \frac{s \cdot (|r_1| - h)}{2}\right]$$

$$b_1 = 2 \cdot |r_1| \cdot \arcsin\left(\frac{\sqrt{2 \cdot |r_1| \cdot \frac{2 \cdot |r_2| \cdot |TT| - |TT|^2}{2 \cdot (|r_1| - |r_2| + |TT|)} - \left(\frac{2 \cdot |r_2| \cdot |TT| - |TT|^2}{2 \cdot (|r_1| - |r_2| + |TT|)}\right)^2}}{|r_1|}\right)$$

$$b_2 = 2 \cdot |r_2| \cdot \arcsin\left(\frac{\sqrt{2 \cdot |r_1| \cdot \frac{2 \cdot |r_2| \cdot |TT| - |TT|^2}{2 \cdot (|r_1| - |r_2| + |TT|)} - \left(\frac{2 \cdot |r_2| \cdot |TT| - |TT|^2}{2 \cdot (|r_1| - |r_2| + |TT|)}\right)^2}}{|r_2|}\right)$$

-continued $$s = 2 \cdot \left| \sqrt{2 \cdot |r_1| \cdot \frac{2 \cdot |r_2| \cdot |TT| - |TT|^2}{2 \cdot (|r_1| - |r_2| + |TT|)} - \left(\frac{2 \cdot |r_2| \cdot |TT| - |TT|^2}{2 \cdot (|r_1| - |r_2| + |TT|)}\right)^2} \right|$$

$$h = \frac{2 \cdot |r_2| \cdot |TT| - |TT|^2}{2 \cdot (|r_1| - |r_2| + |TT|)}$$

and for which there is an $r_{N_{ref}}$ which with reference to the value of $A_{eqv}$ ascertained by the above relationship, satisfies the following conditions that $A_{eqv}$ is likewise $$A_{eqv} = \pi \cdot |r_{N_{ref}}|^2 +$$

$$N_{ref} \cdot \left[ |r_2|^2 \cdot \arcsin\left( \frac{\sqrt{2 \cdot |r_{N_{ref}}| \cdot \frac{2 \cdot |r_2| \cdot \frac{1.3 - 1.3^2}{2 \cdot \left(\frac{|r_{N_{ref}}| - }{|r_2| + 1.3}\right)} - \left(\frac{2 \cdot |r_2| \cdot \frac{1.3 - 1.3^2}{2 \cdot \left(\frac{|r_{N_{ref}}| - }{|r_2| + 1.3}\right)}}\right)^2}}{|r_2|} \right) - \right.$$

$$\left| \sqrt{2 \cdot |r_{N_{ref}}| \cdot \frac{2 \cdot |r_2| \cdot \frac{1.3 - 1.3^2}{2 \cdot \left(\frac{|r_{N_{ref}}| - }{|r_2| + 1.3}\right)} - \left(\frac{2 \cdot |r_2| \cdot \frac{1.3 - 1.3^2}{2 \cdot \left(\frac{|r_{N_{ref}}| - }{|r_2| + 1.3}\right)}}\right)^2} \right| \cdot$$

$$\left( |r_2| - \left( 1.3 + \frac{2 \cdot |r_2| \cdot 1.3 - 1.3^2}{2 \cdot \left(|r_{N_{ref}}| - |r_2| + 1.3\right)} \right) \right) \right] - |r_{N_{ref}}|^2 \cdot$$

$$\left[ \arcsin\left( \frac{\sqrt{2 \cdot |r_{N_{ref}}| \cdot \frac{2 \cdot |r_2| \cdot \frac{1.3 - 1.3^2}{2 \cdot \left(\frac{|r_{N_{ref}}| - }{|r_2| + 1.3}\right)} - \left(\frac{2 \cdot |r_2| \cdot \frac{1.3 - 1.3^2}{2 \cdot \left(\frac{|r_{N_{ref}}| - }{|r_2| + 1.3}\right)}}\right)^2}}{|r_2|} \right) - \right.$$

$$\left| \sqrt{2 \cdot |r_{N_{ref}}| \cdot \frac{2 \cdot |r_2| \cdot \frac{1.3 - 1.3^2}{2 \cdot \left(=\frac{|r_{N_{ref}}| - }{|r_2| + 1.3}\right)} - \left(\frac{2 \cdot |r_2| \cdot \frac{1.3 - 1.3^2}{2 \cdot \left(\frac{|r_{N_{ref}}| - }{|r_2| + 1.3}\right)}}\right)^2} \right|$$

without infringing the boundary conditions $$\pi \geq N_{ref} \cdot \arcsin\left( \frac{\sqrt{2 \cdot |r_{N_{ref}}| \cdot \frac{2 \cdot |r_2| \cdot \frac{1.3 - 1.3^2}{2 \cdot \left(\frac{|r_{N_{ref}}| - }{|r_2| + 1.3}\right)} - \left(\frac{2 \cdot |r_2| \cdot \frac{1.3 - 1.3^2}{2 \cdot \left(\frac{|r_{N_{ref}}| - }{|r_2| + 1.3}\right)}}\right)^2}}{|r_{N_{ref}}|} \right),$$

$$r_{N_{ref}} < r_{eqv}$$

and where the equivalent diameter $D_{eqv}$ is found from the relationship $D_{eqv} = 2 r_{eqv}$.

12. A method comprising:
thermal cracking of hydrocarbons in the presence of steam by guiding a feed mixture through externally heated pipes configured such that for each said pipe,
the pipe (1) extends along a longitudinal axis (A) and has a number $N_T$ of grooves (2) that have been introduced into the inner surface of the pipe (1) and extend in a helix around the longitudinal axis (A) along the inner surface,
the inner surface into which the grooves (2) have been introduced, in a cross section at right angles to the longitudinal axis (A), has a diameter Di and a radius $r_1 = Di/2$,
the grooves (2) in the cross section at right angles to the longitudinal axis (A), in their groove base (4), each have the form of a circular arc and the circular arc has a radius $r_2$,
the grooves (2) each have a groove depth TT which, in the cross section at right angles to the longitudinal axis (A), corresponds in each case to the smallest distance between the circle having the diameter Di on which the inner surface lies and the center of which lies on the longitudinal axis (A), and the furthest removed point of the groove base (4) of the groove (2) from the longitudinal axis (A), wherein the numerical value IDI of an equivalent diameter D and the number $N_T$ of grooves (2) and the numerical value ITTI of the groove depth TT of the grooves (2) measured in mm satisfy the relationship $$P1*|D_{eqv}|^2 + P2*|D_{eqv}| + P3 = C1 + C2*|TT| + C3*VD + C4*|D_{eqv}| + (|TT| - C5)*(VD - C6)*C7 + (|TT| - C5)* (|D_{eqv}| - C8)*C9$$

with the constants
C1=1946.066
C2=302.378
C3=−2.178
C4=266.002
C5=1.954
C6=50.495
C7=−2.004
C8=79.732
C9=−1.041
C10=0.04631
C11=−0.26550
−0.2≥P1≥−0.3
310≤P2≤315
200≤P3≤1500,
where the groove density VD that describes the ratio of the grooves $N_T$ in the pipe in relation to the reference number $N_{ref}$ of the maximum number of grooves having a groove depth TT=1.3 mm that can be introduced in the inner surface area of a pipe having the same equivalent diameter $D_{eqv}$ in percent is found from the following relationship:

$$VD = N_T/N_{ref}*100$$

and the reference number $N_{ref}$ is the greatest natural number that satisfies the relationship $$N_{ref} \leq \frac{\pi}{\arcsin\left( \frac{\sqrt{2 \cdot |r_{eqv}| \cdot \frac{2 \cdot |r_2| \cdot \frac{1.3 - 1.3^2}{2 \cdot \left(\frac{|r_{eqv}| - }{|r_2| + 1.3}\right)} - \left(\frac{2 \cdot |r_2| \cdot \frac{1.3 - 1.3^2}{2 \cdot \left(\frac{|r_{eqv}| - }{|r_2| + 1.3}\right)}}\right)^2}}{|r_{eqv}|} \right)}$$ where -continued $$|r_{eqv}| = \left|\sqrt{\frac{|A_{eqv}|}{\pi}}\right|$$

$$A_{eqv} = A_1 + N_T \cdot A_T$$

$$A_1 = \pi \cdot |r_1|^2$$

$$A_T = \left[|r_2| \cdot \frac{b_2}{2} - \frac{s \cdot (|r_2| - (|TT| + h))}{2}\right] - \left[|r_1| \cdot \frac{b_1}{2} - \frac{s \cdot (|r_1| - h)}{2}\right]$$

$$b_1 = 2 \cdot |r_1| \cdot \arcsin\left(\frac{\left|\sqrt{2 \cdot |r_1| \cdot \frac{2 \cdot |r_2| \cdot |TT| - |TT|^2}{2 \cdot (|r_1| - |r_2| + |TT|)} - \left(\frac{2 \cdot |r_2| \cdot |TT| - |TT|^2}{2 \cdot (|r_1| - |r_2| + |TT|)}\right)^2}\right|}{|r_1|}\right)$$

$$b_2 = 2 \cdot |r_2| \cdot \arcsin\left(\frac{\left|\sqrt{2 \cdot |r_1| \cdot \frac{2 \cdot |r_2| \cdot |TT| - |TT|^2}{2 \cdot (|r_1| - |r_2| + |TT|)} - \left(\frac{2 \cdot |r_2| \cdot |TT| - |TT|^2}{2 \cdot (|r_1| - |r_2| + |TT|)}\right)^2}\right|}{|r_2|}\right)$$

$$s = 2 \cdot \left|\sqrt{2 \cdot |r_1| \cdot \frac{2 \cdot |r_2| \cdot |TT| - |TT|^2}{2 \cdot (|r_1| - |r_2| + |TT|)} - \left(\frac{2 \cdot |r_2| \cdot |TT| - |TT|^2}{2 \cdot (|r_1| - |r_2| + |TT|)}\right)^2}\right|$$

$$h = \frac{2 \cdot |r_2| \cdot |TT| - |TT|^2}{2 \cdot (|r_1| - |r_2| + |TT|)}$$

and for which there is an $r_{Nref}$ which with reference to the value of $A_{eqv}$ ascertained b the above relationship, satisfies the following conditions that $A_{eqv}$ is likewise $$A_{eqv} = \pi \cdot |r_{Nref}|^2 +$$

$$N_{ref} \cdot \left[\left[|r_2|^2 \cdot \arcsin\left(\frac{\left|\sqrt{2 \cdot |r_{Nref}| \cdot \frac{2 \cdot |r_2| \cdot \frac{1.3 - 1.3^2}{2 \cdot \left(\frac{(|r_{Nref}| -}{|r_2| + 1.3)}\right)} - \left(\frac{2 \cdot |r_2| \cdot \frac{1.3 - 1.3^2}{2 \cdot \left(\frac{(|r_{Nref}| -}{|r_2| + 1.3)}\right)}}{}\right)^2}\right|}{|r_2|}\right) - \right.\right.$$

$$\left|\sqrt{2 \cdot |r_{Nref}| \cdot \frac{2 \cdot |r_2| \cdot \frac{1.3 - 1.3^2}{2 \cdot \left(\frac{(|r_{Nref}| -}{|r_2| + 1.3)}\right)} - \left(\frac{2 \cdot |r_2| \cdot \frac{1.3 - 1.3^2}{2 \cdot \left(\frac{(|r_{Nref}| -}{|r_2| + 1.3)}\right)}}{}\right)^2}\right| \cdot$$

$$\left(|r_2| - \left(1.3 + \frac{2 \cdot |r_2| \cdot 1.3 - 1.3^2}{2 \cdot (|r_{Nref}| - |r_2| + 1.3)}\right)\right)\right] - |r_{Nref}|^2 \cdot$$

$$\arcsin\left(\frac{\left|\sqrt{2 \cdot |r_{Nref}| \cdot \frac{2 \cdot |r_2| \cdot \frac{1.3 - 1.3^2}{2 \cdot \left(\frac{(|r_{Nref}| -}{|r_2| + 1.3)}\right)} - \left(\frac{2 \cdot |r_2| \cdot \frac{1.3 - 1.3^2}{2 \cdot \left(\frac{(|r_{Nref}| -}{|r_2| + 1.3)}\right)}}{}\right)^2}\right|}{|r_2|}\right) -$$

$$\left|\sqrt{2 \cdot |r_{Nref}| \cdot \frac{2 \cdot |r_2| \cdot \frac{1.3 - 1.3^2}{2 \cdot \left(\frac{(|r_{Nref}| -}{|r_2| + 1.3)}\right)} - \left(\frac{2 \cdot |r_2| \cdot \frac{1.3 - 1.3^2}{2 \cdot \left(\frac{(|r_{Nref}| -}{|r_2| + 1.3)}\right)}}{}\right)^2}\right|$$

without infringing the boundary conditions $$\pi \geq N_{ref} \cdot \arcsin\left(\frac{\left|\sqrt{2 \cdot |r_{Nref}| \cdot \frac{2 \cdot |r_2| \cdot \frac{1.3 - 1.3^2}{2 \cdot \left(\frac{(|r_{Nref}| -}{|r_2| + 1.3)}\right)} - \left(\frac{2 \cdot |r_2| \cdot \frac{1.3 - 1.3^2}{2 \cdot \left(\frac{(|r_{Nref}| -}{|r_2| + 1.3)}\right)}}{}\right)^2}\right|}{|r_{Nref}|}\right),$$

$$r_{Nref} < r_{eqv}$$

and where the equivalent diameter $D_{eqv}$ is found from the relationship $D_{eqv} = 2\, r_{eqv}$.

\* \* \* \* \*

UNITED STATES PATENT AND TRADEMARK OFFICE
CERTIFICATE OF CORRECTION

PATENT NO. : 11,220,635 B2
APPLICATION NO. : 16/500595
DATED : January 11, 2022
INVENTOR(S) : Jakobi et al.

It is certified that error appears in the above-identified patent and that said Letters Patent is hereby corrected as shown below:

In the Claims

Claim 1, Column 20, Line 66, delete the term "C10=0.04631".
Claim 1, Column 20, Line 67, delete the term "C11=-0.26550".
Claim 1, Column 22, Line 21, in the denominator, replace the term "$|r_2|$" with --$|r_1|$--.
Claim 1, Column 22, Line 25 immediately after the equation term and before Line 30, insert the term $$-- \bullet \left( \left| r_{N_{ref}} \right| - \frac{2 \cdot |r_2| \cdot 1.3 - 1.3^2}{2 \cdot \left( \left| r_{N_{ref}} \right| - |r_2| + 1.3 \right)} \right) \Bigg] \Bigg] --.$$

Claim 2, Column 23, Line 21, the term "010=0.04631" should read as --C10=0.04631--.
Claim 2, Column 24, Line 44, in the denominator, replace the term "$|r_2|$" with --$|r_1|$--.
Claim 2, Column 24, Line 50 immediately after the equation term and before Line 53, insert the term $$-- \bullet \left( \left| r_{N_{ref}} \right| - \frac{2 \cdot |r_2| \cdot 1.3 - 1.3^2}{2 \cdot \left( \left| r_{N_{ref}} \right| - |r_2| + 1.3 \right)} \right) \Bigg] \Bigg] --.$$

Claim 11, Column 26, Line 22, delete the term "C10=0.04631".
Claim 11, Column 26, Line 23, delete the term "C11=-0.26550".

Signed and Sealed this
Thirteenth Day of September, 2022

*Katherine Kelly Vidal*

Katherine Kelly Vidal
*Director of the United States Patent and Trademark Office*

CERTIFICATE OF CORRECTION (continued)
U.S. Pat. No. 11,220,635 B2

Claim 11, Column 27, Line 44, in the denominator, replace the term "|r₂|" with --|r₁|--.
Claim 11, Column 27, Line 50 immediately after the equation term and before Line 52, insert the term $$-- \cdot \left( \left| r_{N_{ref}} \right| - \frac{2 \cdot |r_2| \cdot 1.3 - 1.3^2}{2 \cdot \left( \left| r_{N_{ref}} \right| - |r_2| + 1.3 \right)} \right) \Big] \Big] --.$$

Claim 12, Column 28, Line 25, replace the term "IDI" with --|D$eqv$|--.
Claim 12, Column 28, Line 26, replace the term "D" with --$Deqv$--.
Claim 12, Column 28, Line 43, delete the term "C10=0.04631".
Claim 12, Column 28, Line 44, delete the term "C11=-0.26550".
Claim 12, Column 30, Line 21, in the denominator, replace the term "|r₂|" with --|r₁|--.
Claim 12, Column 30, Line 25 immediately after the equation term and before Line 30, insert the term $$-- \cdot \left( \left| r_{N_{ref}} \right| - \frac{2 \cdot |r_2| \cdot 1.3 - 1.3^2}{2 \cdot \left( \left| r_{N_{ref}} \right| - |r_2| + 1.3 \right)} \right) \Big] \Big] --.$$